United States Patent
Sakuyama et al.

(10) Patent No.: US 7,333,664 B2
(45) Date of Patent: Feb. 19, 2008

(54) IMAGE COMPRESSION METHOD CAPABLE OF REDUCING TILE BOUNDARY DISTORTION

(75) Inventors: Hiroyuki Sakuyama, Tokyo (JP); Takao Inoue, Kanagawa (JP); Shin Aoki, Kanagawa (JP); Keiichi Ikebe, Kanagawa (JP); Taku Kodama, Kanagawa (JP); Takeshi Koyama, Tokyo (JP); Ikuko Yamashiro, Kanagawa (JP); Takashi Maki, Kanagawa (JP); Akira Takahashi, Kanagawa (JP); Takanori Yano, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 854 days.

(21) Appl. No.: 10/816,068

(22) Filed: Mar. 31, 2004

(65) Prior Publication Data

US 2004/0228534 A1 Nov. 18, 2004

(30) Foreign Application Priority Data

Mar. 31, 2003 (JP) .............................. 2003-097151

(51) Int. Cl.
- G06K 9/36 (2006.01)
- G06K 9/46 (2006.01)
- H04B 1/66 (2006.01)
- H04N 7/12 (2006.01)
- H04N 11/02 (2006.01)
- H04N 11/04 (2006.01)

(52) U.S. Cl. .................. 382/240; 382/248; 375/240.19

(58) Field of Classification Search ................ 382/240, 382/248, 251; 348/395.1, 403.1; 375/240.19
See application file for complete search history.

(56) References Cited

U.S. PATENT DOCUMENTS 5,710,835 A * 1/1998 Bradley ....................... 382/233
2003/0002742 A1* 1/2003 Sano et al. .................. 382/239

FOREIGN PATENT DOCUMENTS

JP 2002-374532 12/2002

OTHER PUBLICATIONS

Kharitonenko et al. ("A wavelet transform with point-symmetric extension at tile boundaries," IEEE T. Image Processing, V.11, No. 12, Dec. 2002, pp. 1357-1364) uses point-symmetric extension at tile boundaries to reduce tiling artifacts.*

(Continued)

*Primary Examiner*—Matthew C. Bella
*Assistant Examiner*—Yubin Hung
(74) *Attorney, Agent, or Firm*—Blakely, Sokoloff, Taylor & Zafman LLP

(57) ABSTRACT

An image compressing apparatus divides an image into plural tiles, decomposes each tile into plural sub band by frequency conversion, and conducts bit plane encoding of each sub band for each encoding unit, wherein the image compressing apparatus includes a code discarding unit selectively discarding a code obtained by the bit plane encoding for each encoding unit, and wherein the code discarding unit includes a discard amount setting unit that makes generally even the amount of code discarding in the encoding units that are in mutually adjacent relationship across a tile boundary.

23 Claims, 23 Drawing Sheets

OTHER PUBLICATIONS

Hashimoto et al. ("JPEG2000 encoder for reducing tiling artifacts and accelerating the coding process," ICIP, V. 1, Sep. 14-17, 2003, pp. 645-648) determines truncation point (to discard code) based on the entropy and distortion of a coding path [p. 647, Sect. 3.2].*

Hashimoto et al. ("Tile boundary artifact reduction algorithms for tile size conversion of wavelet image," 10th ACM Int'l Conf. on Multimedia, Dec. 2003, pp. 97-105) reduces tiling artifacts by reconstructing needed pixels to generate compensated coefficients [p. 100, Sect. 3.3.1].*

Wei et al. ("Boundary artifact reduction using odd tile length and the low pass first convention (OTLPF)," Proceedings of SPIE, vol. 4472 (2001), pp. 282-289) uses OTLPF along with tile overlap to reduce tiling artifacts [p. 287, Sect. 4].*

Nomizu, Y., "Next Generation Image Encoding Method JPEG 2000," Triceps, Feb. 13, 2001 (English summary of pertinent section and description of technological background of JPEG 2000 is also attached).

Taubman, D.S. et al., "JPEG 2000: Image Compression Fundamentals, Standards and Practice," Kluwer, 2002, pp. 237-348.

* cited by examiner

TILE BOUNDARY

TILE BOUNDARY

FIG.16

|     | DECOMPOSITION LEVEL | |
|-----|-----|-----|
|     | 2 | 1 |
| LL  | 2.3 |  |
| HL  | 1.6 | 1.0 |
| LH  | 1.6 | 1.0 |
| HH  | 1.1 | 0.7 |

FIG.17

| Y  | 1.7 |
|----|-----|
| Cb | 0.8 |
| Cr | 0.8 |

FIG.18

| Y   | DECOMPOSITION LEVEL | |
|-----|-----|-----|
|     | 2 | 1 |
| LL  | 3.9 |  |
| HL  | 2.7 | 1.8 |
| LH  | 2.7 | 1.8 |
| HH  | 1.9 | 1.2 |

FIG.19

| Cb | DECOMPOSITION LEVEL | |
|---|---|---|
| | 2 | 1 |
| LL | 1.9 | |
| HL | 1.3 | 0.9 |
| LH | 1.3 | 0.9 |
| HH | 0.9 | 0.6 |

FIG.20

| Cr | DECOMPOSITION LEVEL | |
|---|---|---|
| | 2 | 1 |
| LL | 1.9 | |
| HL | 1.3 | 0.9 |
| LH | 1.3 | 0.9 |
| HH | 0.9 | 0.6 |

FIG.22 even odd even odd

| L | L | L | L | L | L | L | L | L | L | L | L | L | L | L | L |
|---|---|---|---|---|---|---|---|---|---|---|---|---|---|---|---|
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |
| L | L | L | L | L | L | L | L | L | L | L | L | L | L | L | L |
| H | H | H | H | H | H | H | H | H | H | H | H | H | H | H | H |

FIG.23 even odd even odd

| LL | HL | LL | HL | LL | HL | LL | HL | LL | HL | LL | HL | LL | HL | LL | HL |
|----|----|----|----|----|----|----|----|----|----|----|----|----|----|----|----|
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |
| LL | HL | LL | HL | LL | HL | LL | HL | LL | HL | LL | HL | LL | HL | LL | HL |
| LH | HH | LH | HH | LH | HH | LH | HH | LH | HH | LH | HH | LH | HH | LH | HH |

FIG.24

| 1LL 1LL 1LL 1LL 1LL 1LL 1LL 1LL | 1HL 1HL 1HL 1HL 1HL 1HL 1HL 1HL |
|---|---|
| 1LL 1LL 1LL 1LL 1LL 1LL 1LL 1LL | 1HL 1HL 1HL 1HL 1HL 1HL 1HL 1HL |
| 1LL 1LL 1LL 1LL 1LL 1LL 1LL 1LL | 1HL 1HL 1HL 1HL 1HL 1HL 1HL 1HL |
| 1LL 1LL 1LL 1LL 1LL 1LL 1LL 1LL | 1HL 1HL 1HL 1HL 1HL 1HL 1HL 1HL |
| 1LL 1LL 1LL 1LL 1LL 1LL 1LL 1LL | 1HL 1HL 1HL 1HL 1HL 1HL 1HL 1HL |
| 1LL 1LL 1LL 1LL 1LL 1LL 1LL 1LL | 1HL 1HL 1HL 1HL 1HL 1HL 1HL 1HL |
| 1LL 1LL 1LL 1LL 1LL 1LL 1LL 1LL | 1HL 1HL 1HL 1HL 1HL 1HL 1HL 1HL |
| 1LL 1LL 1LL 1LL 1LL 1LL 1LL 1LL | 1HL 1HL 1HL 1HL 1HL 1HL 1HL 1HL |
| 1LH 1LH 1LH 1LH 1LH 1LH 1LH 1LH | 1HH 1HH 1HH 1HH 1HH 1HH 1HH 1HH |
| 1LH 1LH 1LH 1LH 1LH 1LH 1LH 1LH | 1HH 1HH 1HH 1HH 1HH 1HH 1HH 1HH |
| 1LH 1LH 1LH 1LH 1LH 1LH 1LH 1LH | 1HH 1HH 1HH 1HH 1HH 1HH 1HH 1HH |
| 1LH 1LH 1LH 1LH 1LH 1LH 1LH 1LH | 1HH 1HH 1HH 1HH 1HH 1HH 1HH 1HH |
| 1LH 1LH 1LH 1LH 1LH 1LH 1LH 1LH | 1HH 1HH 1HH 1HH 1HH 1HH 1HH 1HH |
| 1LH 1LH 1LH 1LH 1LH 1LH 1LH 1LH | 1HH 1HH 1HH 1HH 1HH 1HH 1HH 1HH |
| 1LH 1LH 1LH 1LH 1LH 1LH 1LH 1LH | 1HH 1HH 1HH 1HH 1HH 1HH 1HH 1HH |
| 1LH 1LH 1LH 1LH 1LH 1LH 1LH 1LH | 1HH 1HH 1HH 1HH 1HH 1HH 1HH 1HH |

FIG.25

| 2LL 2LL 2LL 2LL | 2HL 2HL 2HL 2HL | 1HL 1HL 1HL 1HL 1HL 1HL 1HL 1HL |
|---|---|---|
| 2LL 2LL 2LL 2LL | 2HL 2HL 2HL 2HL | 1HL 1HL 1HL 1HL 1HL 1HL 1HL 1HL |
| 2LL 2LL 2LL 2LL | 2HL 2HL 2HL 2HL | 1HL 1HL 1HL 1HL 1HL 1HL 1HL 1HL |
| 2LL 2LL 2LL 2LL | 2HL 2HL 2HL 2HL | 1HL 1HL 1HL 1HL 1HL 1HL 1HL 1HL |
| 2LH 2LH 2LH 2LH | 2HH 2HH 2HH 2HH | 1HL 1HL 1HL 1HL 1HL 1HL 1HL 1HL |
| 2LH 2LH 2LH 2LH | 2HH 2HH 2HH 2HH | 1HL 1HL 1HL 1HL 1HL 1HL 1HL 1HL |
| 2LH 2LH 2LH 2LH | 2HH 2HH 2HH 2HH | 1HL 1HL 1HL 1HL 1HL 1HL 1HL 1HL |
| 2LH 2LH 2LH 2LH | 2HH 2HH 2HH 2HH | 1HL 1HL 1HL 1HL 1HL 1HL 1HL 1HL |
| 1LH 1LH 1LH 1LH 1LH 1LH 1LH 1LH | | 1HH 1HH 1HH 1HH 1HH 1HH 1HH 1HH |
| 1LH 1LH 1LH 1LH 1LH 1LH 1LH 1LH | | 1HH 1HH 1HH 1HH 1HH 1HH 1HH 1HH |
| 1LH 1LH 1LH 1LH 1LH 1LH 1LH 1LH | | 1HH 1HH 1HH 1HH 1HH 1HH 1HH 1HH |
| 1LH 1LH 1LH 1LH 1LH 1LH 1LH 1LH | | 1HH 1HH 1HH 1HH 1HH 1HH 1HH 1HH |
| 1LH 1LH 1LH 1LH 1LH 1LH 1LH 1LH | | 1HH 1HH 1HH 1HH 1HH 1HH 1HH 1HH |
| 1LH 1LH 1LH 1LH 1LH 1LH 1LH 1LH | | 1HH 1HH 1HH 1HH 1HH 1HH 1HH 1HH |
| 1LH 1LH 1LH 1LH 1LH 1LH 1LH 1LH | | 1HH 1HH 1HH 1HH 1HH 1HH 1HH 1HH |
| 1LH 1LH 1LH 1LH 1LH 1LH 1LH 1LH | | 1HH 1HH 1HH 1HH 1HH 1HH 1HH 1HH |

DECOMNPOSITION LEVEL 3

IMAGE COMPRESSION METHOD CAPABLE OF REDUCING TILE BOUNDARY DISTORTION

The present application claims priority to the corresponding Japanese Application No. 2003-097151, filed on Mar. 31, 2003, the entire contents of which are hereby incorporated by reference.

BACKGROUND OF THE INVENTION

The present invention generally relates to compression of images and more particularly to a code discarding processing used in an image compression process conducted by an image encoding algorithm that divides an image into tiles and decomposes each tile into sub bands by frequency conversion and further conducts bit-plane encoding of the coefficients for the sub-bands in each encoding unit.

As an example of this type of image encoding process, a JPEG 2000 encoding algorithm is known. It should be noted that the JPEG-2000 algorithm has become an international standard in 2001 (basic specification: ISO/IEC FCD 15,444-1). For more information about JPEG 2000, reference should be made to Yasuyuki Nomizu, "JPEG 2000, Next Generation Image Encoding Method," Feb. 13, 2001 Triceps Co., Ltd. Further, motion picture processing of JPEG 2000 is defined in the expansion of JPEG 2000 (ISO/IEC FCD 15,444-3).

In the motion picture processing of the JPEG 2000 algorithm, each of the time-sequentially continuing still pictures is treated as a frame, and each frame is encoded by an algorithm defined in the basic specification of JPEG 2000, independently to the frames before or after the frame under consideration. Thus, each motion picture frame of JPEG 2000 can be treated similarly to a still picture.

In JPEG 2000, an image is divided into non-overlapping rectangular regions called tiles, and in each tile, the image is decomposed into plural sub bands as a result of frequency conversion (two-dimensional discrete wavelet transformation). Further, the obtained wavelet coefficients are entropy encoded for each sub band, after quantization. In this entropy encoding, a block based bit plane encoding technology called EBCOT, which includes dividing into blocks, coefficient modeling, and binary arithmetic encoding, is used.

In JPEG 2000, on the other hand, there exits a problem in that discontinuity of images becomes observable in the decompressed image at the tile boundary in the case the compression ratio is increased (tile boundary distortion). It should be noted that such tile boundary distortion is caused primarily as a result of an increase in the quantization error of the wavelet coefficients at the tile edge, while such an increase of the quantization error is caused as a result of the procedure of interpolating the picture element values or coefficient values by using a process called mirroring at the time of performing the wavelet transformation of each tile. It should be noted that there is a shortage of picture elements occurs at the tile edge, and the mirroring technique is used in view of such shortage of the picture elements.

Based upon this recognition, there is proposed a method of suppressing the tile boundary distortion as disclosed in the U.S. Pat. No. 5,710,835 in which the division of an image into the tiles is conducted such that the adjacent tiles overlap with each other. Further, there is a known procedure of decreasing the quantization rate at the tile boundary as compared with the quantization rate for other parts of the image. Reference should be made to Japanese Laid Open Patent Application 2002-374532.

Another reason the tile boundary distortion is caused is the influence of the code discard processing.

In JPEG 2000, it should be noted that the coefficients of each sub band are encoded by every encoding unit called a code block, which is used as the unit of encoding processing, wherein the encoding of the coefficients is conducted for each bit plane starting from the upper most bit toward the lower most bit. In this encoding process, there is conducted a process for selectively discarding the codes of each bit plane in each code block, until a desired compression ratio (code amount) is achieved. This process of discarding the code is equivalent to the quantization of the coefficients, and thus, this process is called post quantization.

In such a procedure of discarding the codes, the importance of the code is evaluated for the bit planes in each of the code blocks, and the discarding of the code is conducted consecutively, starting from the code having the least significant importance. With regard to the evaluation method of the importance of the code, various methods are proposed, including the one described in D. S. Taubman and M. W. Marcellin, "JPEG2000: Image Compression, Fundamentals, Standards and Practice," Kluwer, 2002. Further, with regard to the implementation method for discarding the code starting from the one having the least significant importance, it is typical to use a process conducted by the Lagrange's method of undetermined multipliers, as is described in D. S. Taubman and M. W. Marcellin, op. cit.

However, even in the case where the process disclosed in the U.S. Pat. No. 5,710,835 or Japanese Laid Open Patent Application 2002-374532 is employed, there still arises cases in which the tile boundary distortion cannot be suppressed sufficiently due to the effect of the foregoing code discarding process.

SUMMARY OF THE INVENTION

An image compression method and apparatus capable of reducing tile boundary distortion is described. In one embodiment, the image compressing apparatus divides an image into plural tiles, decomposing each of the tiles into plural sub bands by frequency conversion, and applies bit plane encoding to each of the sub bands for each encoding unit. The image compresses apparatus comprises a code discarding unit to selectively discard a code obtained by the bit plane encoding for each encoding unit, where the code discarding unit includes a discard amount setting unit that makes generally even the amount of code discarding in those encoding units that are in mutually adjacent relationship across a tile boundary.

BRIEF DESCRIPTION OF THE DRAWING

FIG. 16 is a diagram showing a square root of a sub band gain of a 5×3 transformation;

FIG. 17 is a diagram showing square root of a gain of a reverse RCT transformation;

FIG. 18 is a diagram showing a square root of a sub band gain of brightness Y in consideration of the gain of the reverse RCT transformation;

FIG. 19 is a square root of the sub band gain of color difference Cb in consideration of the gain of the reverse RCT transformation;

FIG. 20 is a diagram showing square root of the sub band gain of color difference Cr in consideration of the gain of the reverse RCT transformation;

FIG. 22 is a diagram showing a coefficient arrangement obtained by a wavelet transformation in the vertical direction of the tile image;

FIG. 23 is a diagram showing a coefficient arrangement obtained by a wavelet transformation in a horizontal direction with respect to the coefficient arrangement of FIG. 22;

FIG. 24 is a diagram showing a deinterleaved arrangement of the coefficient arrangement of FIG. 23;

FIG. 25 is a diagram showing a coefficient arrangement in the state after deinterleaving obtained by conducting a two-dimension wavelet transformation twice;

DETAILED DESCRIPTION OF THE PREFERRED EMBODIMENTS

Figure 1:
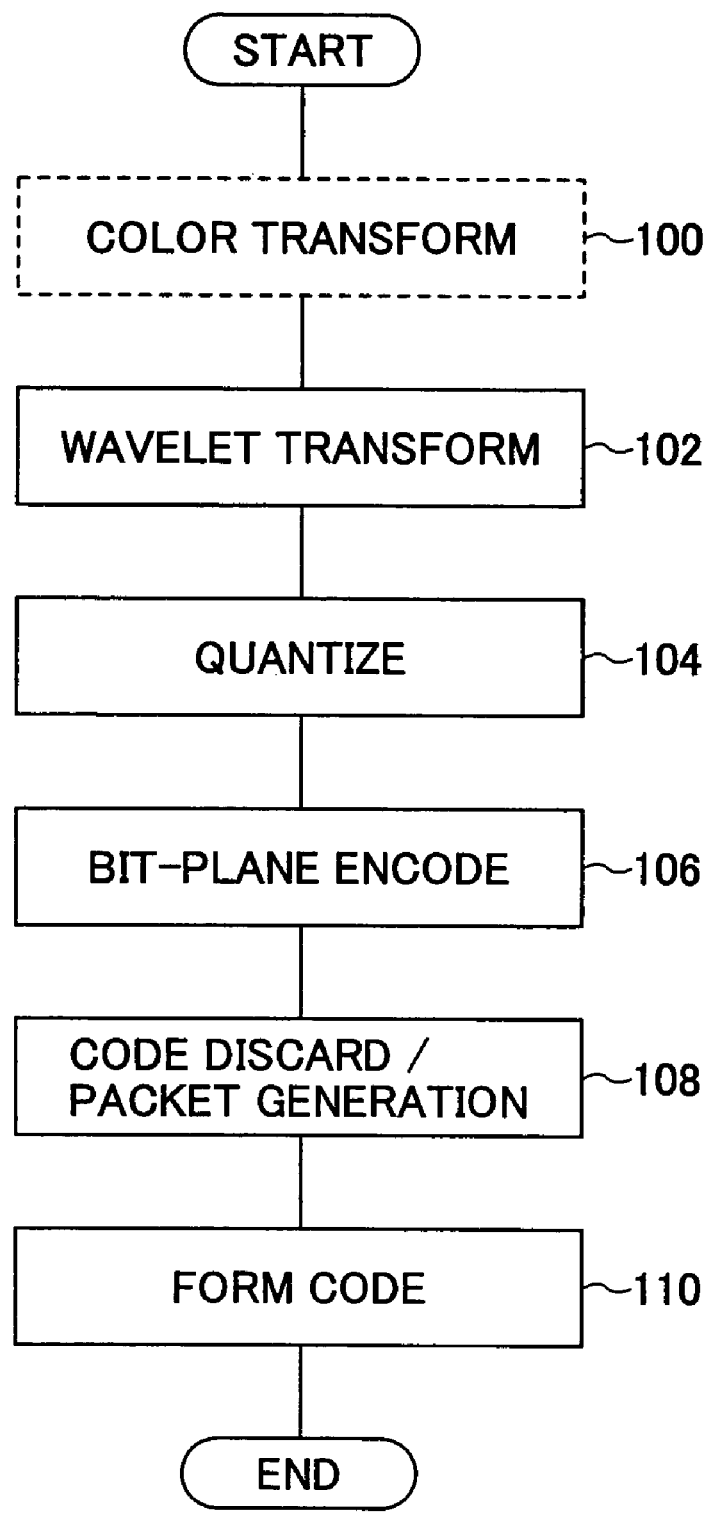
FIG. 1 is a flowchart for illustrating an embodiment of the present invention.

Accordingly, one or more embodiments of the present invention include a novel and useful image compression method and apparatus wherein the foregoing problems are eliminated.

Another and more specific embodiments of the present invention include an image compression method and apparatus capable of suppressing the tile boundary distortion caused by the code discard processing effectively.

An embodiment of the present invention includes an image compression apparatus that compresses images by an image-encoding algorithm, where the image-encoding algorithm divides an image into plural tiles, decomposes each tile into plural sub bands by frequency conversion, and conducts bit-plane encoding for each of the sub-bands. The sub-band forms an encoding unit. The image compression apparatus comprises a code discarding unit for discarding a code obtained by the bit plane encoding selectively in each encoding unit. The code discarding unit includes trimming units for trimming a code discard amount such that the code discard amount becomes generally even in the encoding units that are adjacent to each other across a tile boundary.

Another embodiment of the present invention includes an image compression apparatus as noted above, wherein the trimming unit makes generally even the code discard amounts for the encoding units that are adjacent to each other across the tile boundary, the encoding units forming the same sub band in the respective tiles.

Another embodiment of the present invention includes an image compression apparatus as noted above, wherein the trimming unit makes generally even the code discard amounts between the encoding units adjacent to each other across the tile boundary, the encoding units forming a sub band of a specific decomposition level or lower.

Another embodiment of the present invention includes an image compression apparatus as noted above, wherein the code discarding unit includes ranking units for providing an order of discarding the codes to each bit plane code of each encoding unit according to the importance of the bit plane code. The trimming unit changes the order provided to each bit plane code by the ranking unit in the encoding units that are adjacent to each other across a tile boundary.

Another embodiment of the present invention includes an image compression apparatus as noted above, wherein the trimming unit comprises calculation units for calculating the importance of bit plane codes for encoding units adjacent to each other across the tile boundary by treating the encoding units as a single encoding unit. The code discarding unit comprises: an importance calculation unit for calculating importance of bit plane codes in each of the encoding units; and a ranking unit providing order of discarding codes to each of the bit plane codes of the encoding units adjacent to each other across the tile boundary according to the importance calculated by the trimming unit. The ranking unit further provides an order of discarding codes to each of the bit plane codes of encoding units that are not adjacent to each other across the tile boundary, according to the importance calculated by the importance calculation unit.

Another embodiment of the present invention includes an image compression apparatus as noted above, wherein the algorithm of image encoding is an algorithm based on JPEG 2000 and wherein a code block is used for the encoding unit.

Another embodiment of the present invention includes an image compression apparatus as noted above, wherein the algorithm of image encoding is an algorithm based on JPEG 2000 and a code block is used for the encoding unit, and further wherein the encoding unit subjected to trimming is an encoding unit of HL sub band and HH sub band.

Another embodiment of the present invention includes an image compression method for compressing images according to an image encoding algorithm, where the image encoding algorithm divides an image into plural tiles, decomposes each tile into plural sub bands by frequency conversion, and conducts bit plane encoding to each sub band for each of encoding units. The method comprises selectively discarding a code obtained by the bit plane encoding for each encoding unit, and discarding code by, at least, in part, trimming the amount of discarded code for coding units that are adjacent to each other across a tile boundary.

Another embodiment of the present invention includes an image compression method as noted above, wherein trimming makes generally even the amount of discarded codes in the encoding units that are adjacent to each other across the tile boundary and forming the same sub band in the respective encoding units.

Another embodiment of the present invention includes an image compression method as noted above, wherein trimming makes generally even the amount of discarded codes in the encoding units that are adjacent to each other across the tile boundary and forming a sub band of a specific decomposition level or lower in the respective encoding units.

Another embodiment of the present invention includes an image compression method as noted above, wherein the image encoding algorithm is an algorithm based on JPEG 2000.

According to the image compression apparatus or method of the present invention, it becomes possible to suppress the tile boundary distortion caused by the effect of code discarding at the time of the image compression effectively. Thus, it becomes possible to reproduce high quality images with reduced tile boundary distortion by decompressing the image compressed by the image compression apparatus or method of the present invention. Further, various effects explained with reference to the embodiments is obtained.

Other embodiments and further features of the present invention will become apparent from the following detailed description when read in conjunction with the attached drawings.

Because the present invention is applicable to the case that uses JPEG 2000 as the image encoding algorithm, the present invention will be explained for the embodiments that use the JPEG 2000 algorithm. It should be noted, however, that the present invention is applicable also to the cases that use image encoding methods other than JPEG 2000 as long as it is the image encoding method that divides an image into tiles and decomposes each tile to sub band by frequency conversion and conduct bit plane encoding of the coefficients of each sub band for each of the encoding units and further capable of conducting discarding of the codes according to the needs.

In order facilitate understanding of the invention, explanation will be made first about outline of the algorithm of JPEG 2000.

First, compression process will be explained.

In the compression process, an image of each color component is divided into non-overlapping tiles of a rectangular form, and each of the tiles of each color component thus divided is subjected to compression.

Here, each tile image of each color component is subjected to a color transformation process for the purpose of improving the of compression ratio. In the event the image is given in the form of RGB data, for example, an RCT transformation below is applied.

Brightness $Y=\text{floor}((R+2G+B)/4)$

Color difference $Cr=R-G$

Color difference $Cb=B-G$ (1)

Further, a reverse RCT transformation is defined as follows.

$R=G+Cr$ $G=Y-\text{floor}((Cr+Cb)/4)$ $B=Cb+G$ (2)

Here, it should be noted that floor (x) in the above equation is a floor function of x (a function substituting a real number x to an integer not exceeding x and closest to x).

It should be noted that this color transformation process could be omitted. In that case, each RGB component is processed as it is. Further, in the case of a monochrome image, such a color transformation is unnecessary.

Next, the tile images of each color component are subjected to a two-dimensional wavelet transformation (discrete wavelet transformation), and as a result, each tile image is decomposed into plural sub bands. Further, the wavelet coefficients are quantized for each sub band. In JPEG 2000, both reversible compression (loss-less compression) and irreversible compression (lossy compression) is possible. In one embodiment, in the case of the reversible compression, the quantization step number is always one, and there occurs no substantial quantization in this stage.

Here, it should be noted that the wavelet coefficients after the quantization are subjected to bit-plane encoding in each sub band, wherein the bit-plane encoding is conducted for each encoding unit called a code block starting from the upper bit down to the lower bit.

With regards to the codes thus obtained, the code discard processing mentioned before is conducted, and there is formed a packet by gathering the remaining codes that were not discarded. Further, the packets are arranged in a desired order and code data of predetermined format is formed by adding thereto necessary tags and tag information.

Figure 28:
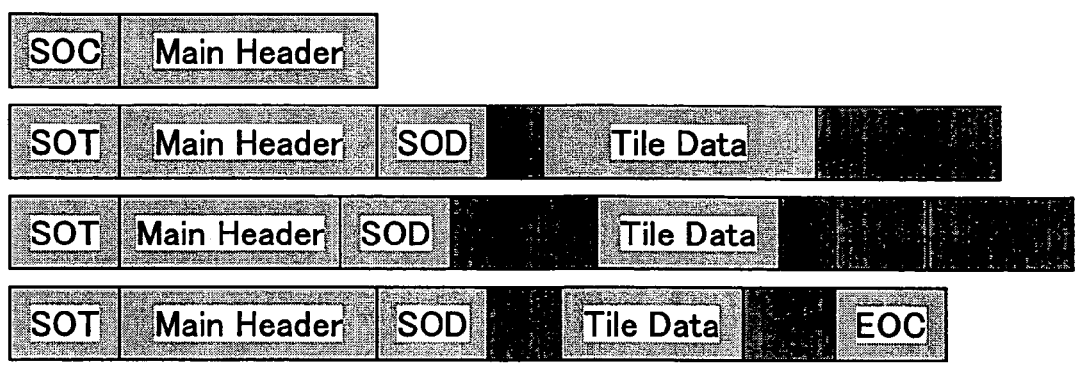
FIG. 28 is a diagram showing a format of the encoding data of JPEG 2000.

FIG. 28 shows the format of the generated JPEG 2000 code data.

As can be seen in FIG. 28, the code data starts with a tag called the SOC marker that indicates the beginning of the code data, wherein tag information called the main header that describes various encoding parameters and quantization parameters follows the SOC marker. Thereafter, the code data for each tile follows. It should be noted that the code data of each tile starts with a tag called SOT marker and includes tag information called tile header (Tile Header), a tag called SOD marker, and tile data (Tile Data) that represents the contents of the code of each tile. Further, a tag called EOC marker indicating the end is provided after the last tile data. Thus, the part after the SOD for each tile in FIG. 28 forms a set of packets.

The decompression process is conducted in a reverse manner to the compression processing.

Thus, the code data is decomposed into a code series for each tile and for each component based on the tag information. By entropy decoding this code series, the wavelet coefficients are restored. Because these wavelet coefficients are quantized, they are subjected to a reverse quantization process, and after applying a reverse two-dimensional wavelet transformation, the image of each tile is reproduced for each color component. The tile images of each color component are returned to the RGB data by a reverse RCT transformation of the above-mentioned Equation (2).

Here, explanation will be made further with regard to the two-dimensional wavelet transformation.

FIGS. 21-25 are diagrams for illustrating the process of conducting a wavelet transformation called 5×3 transformation adopted by JPEG 2000 to a monochromatic tile image of 16×16 picture elements (or a one color component image of a color image) in a vertical direction and a horizontal direction.

Figure 21:
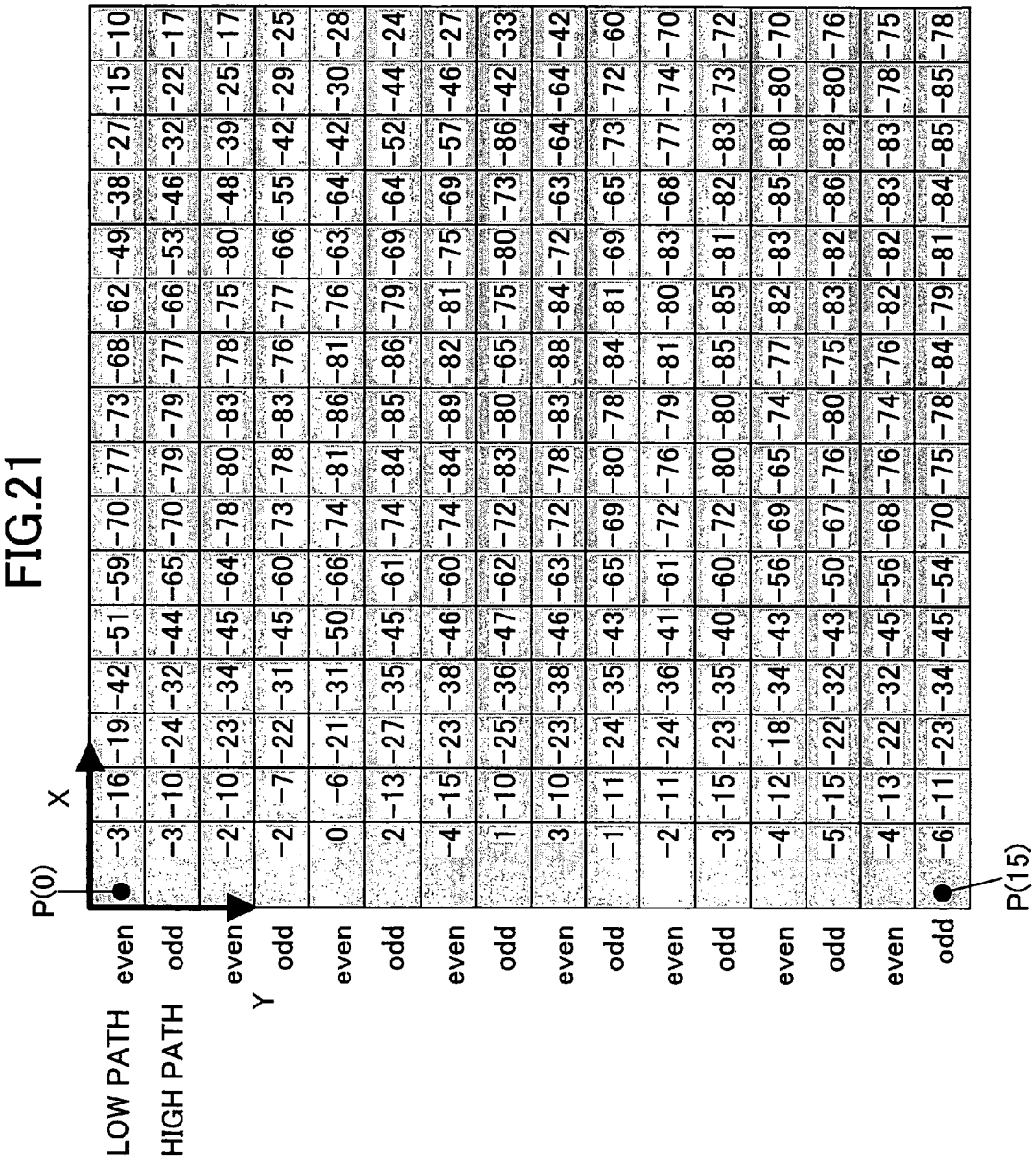
FIG. 21 is a diagram showing an example of a tile image.

FIG. 21 is a tile image before the transformation.

In FIG. 21, X and Y coordinates are defined as represented, and the pixel value for a picture element having a Y coordinate value y is represented as P (y) ($0 \leq y \leq 15$).

In JPEG 2000, a high-pass filtering is applied first in the vertical direction (direction of Y-axis) with regard to the central picture elements having odd Y coordinates (y=2i+1), and the coefficients c(2i+1) are obtained. Next, a low-pass filtering is applied with regard to the central picture elements having even Y coordinate values (y=2i), and coefficients c(2i) are obtained. Further, the foregoing procedure is conducted for all the values of x.

Here, the high-pass filtering and the low-pass filtering are represented respectively by the Equations (3) and (4) as follows.

$$C(2i+1)=P(2i+1)-\text{floor}((P(2i)+P(2i+2))/2) \quad (3)$$

$$C(2i)=P(2i)+\text{floor}((C(2i-1)+C(2i+1)+2)/4) \quad (4)$$

At the edge part of the image, there are cases in which there exist no adjacent picture elements with regard to the central picture element. In such a case, the deficient picture element value is supplemented by a process called "mirroring." It should be noted that mirroring is an operation of folding the pixel values in line-symmetry with regard to the boundary and uses the folded pixel values as the pixel values of the adjacent picture elements.

By representing the coefficients obtained by the high-pass filtering as H and the coefficients obtained by the low pass filtering as L, the image of FIG. 21 is transformed to the array of the L coefficients and H coefficients shown in FIG. 22 as a result of the transformation in the vertical direction.

Next, high-pass filtering is applied to the array of the coefficients of FIG. 22 in the horizontal direction, wherein the high-pass filtering is applied with regard to the central coefficients having odd X coordinate values (y=2i+1), followed by a low-pass filtering applied with regard to the central picture elements having even X coordinate values (x=2i). Further, the foregoing process is conducted to all the y values. In this case, P(2i) and the like of the foregoing equations are regarded as representing the coefficient values.

Designating the coefficients obtained by the low pass filtering about a central L coefficient as LL, the coefficients obtained by the high-pass filtering about a central L coefficient as LL, the coefficients obtained by the low pass filtering about a central H coefficient as LH, and the coefficients obtained by the high-pass filtering about a central H coefficient as HH, the array of the coefficients of FIG. 22 is transformed to the array of coefficients as represented in FIG. 23. Here, it should be noted that the coefficients represented by the same symbol form a group called a sub band. In the case of FIG. 23, there exist four sub bands.

As a result of the foregoing process, one wavelet transformation (one decomposition process) is completed. FIG. 24 shows an array of the wavelet coefficients in which the wavelet coefficients are gathered in each of the sub bands. It should be noted that the process of forming such an array of coefficient is called deinterleaving, while the process of forming the arrangement as represented in FIG. 23 is called interleaving.

Further, a second wavelet transformation is performed similarly by regarding the LL sub band as an original image. As a result of deinterleaving of such a result, the sub band coefficients as represented in FIG. 25 are obtained. In FIGS. 24 and 25, it should be noted that the numeral 1 or 2 prefixed to the coefficients represent the number of the wavelet transformations (decomposition level) performed until that coefficient values are obtained.

Figure 26:
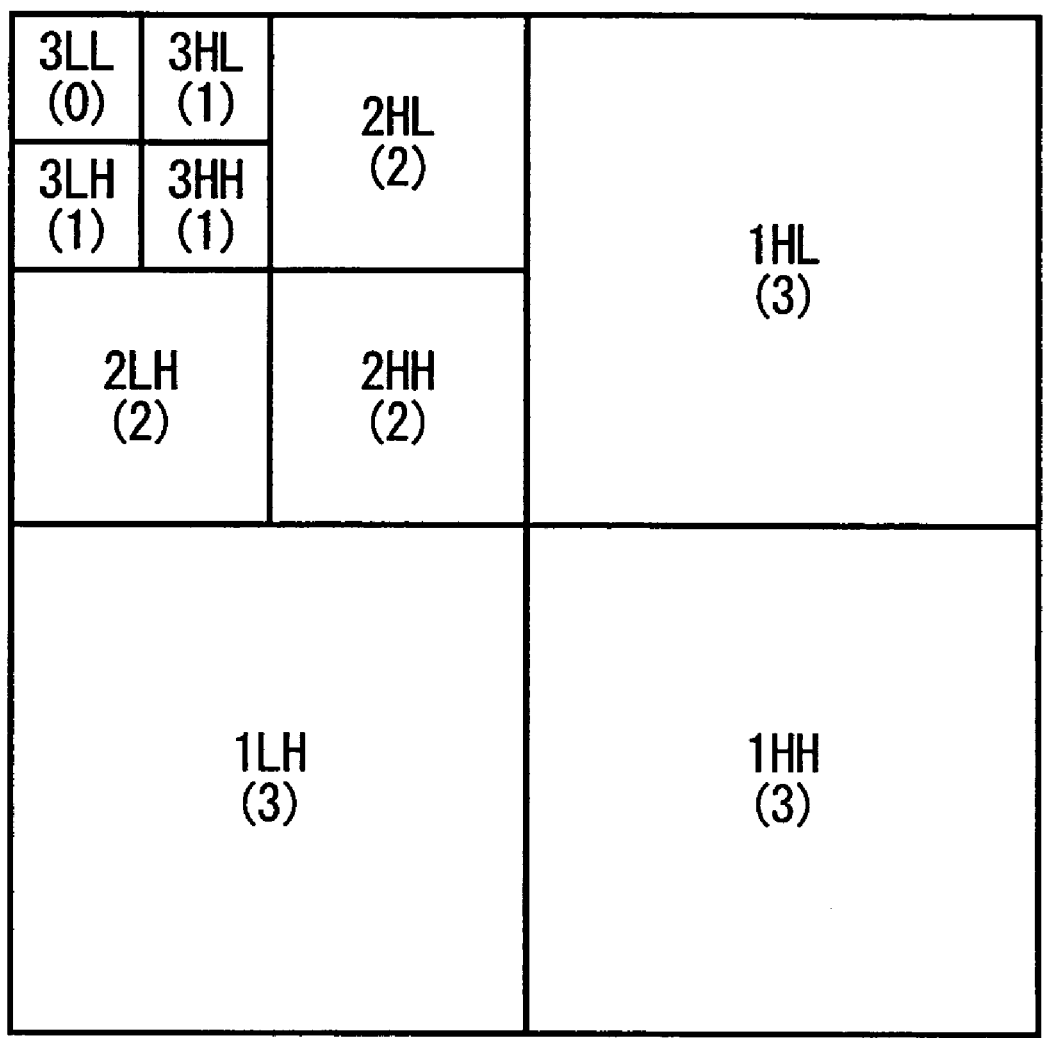
FIG. 26 is a diagram showing a sub band decomposition of decomposition level number three.

FIG. 26 shows an example of the sub band decomposition for the case in which the decomposition level is three. In FIG. 26, it should be noted that the numerals bracketed in each sub band represents a resolution level.

In the case of a reverse wavelet transformation, on the other hand, a reverse low pass filtering is applied to the interleaved coefficient array shown in FIG. 23 first in the horizontal direction such that the reverse low pass filtering is applied with regard to the central coefficients having an even x value (x=2i). Next, a reverse high-pass filtering is applied with regard to the coefficients having odd x values (x=2i+1). Further, the foregoing processing is conducted for all the y values.

Here, it should be noted that the reverse low pass filtering and the reverse high pass filtering are conducted respectively according to Equations (5) and (6) as follows.

$$P(2i)=C(2i)-\text{floor}((C(2i-1)+C(2i+1)+2)/4) \quad (5)$$

$$P(2i+1)=C(2i+1)+\text{floor}((P(2i)+P(2i+2))/2) \quad (6)$$

Similarly as before, there are cases in which a central coefficient lacks an adjacent coefficient at an edge part of an image. In such a case, the coefficient values are supplemented by the mirroring processing.

With this, the coefficient array of FIG. 23 is transformed back to the coefficient array of FIG. 22.

Next, a reverse low pass filtering is applied in the vertical direction about the central coefficients having even y values (y=2i), followed by a reverse high-pass filtering about the central coefficients having odd y values (y=2i+1). By conducting the same to all the x values, one reverse wavelet transformation is completed and the coefficient array of the original image of FIG. 21 is restored. In other words, the original image is reconstructed.

In the case where the wavelet transformation is performed plural times, too, it is possible to regard the arrangement of FIG. 21 as a LL sub band and repeat a similar reverse transformation by using other coefficients such as HL.

Figure 27:
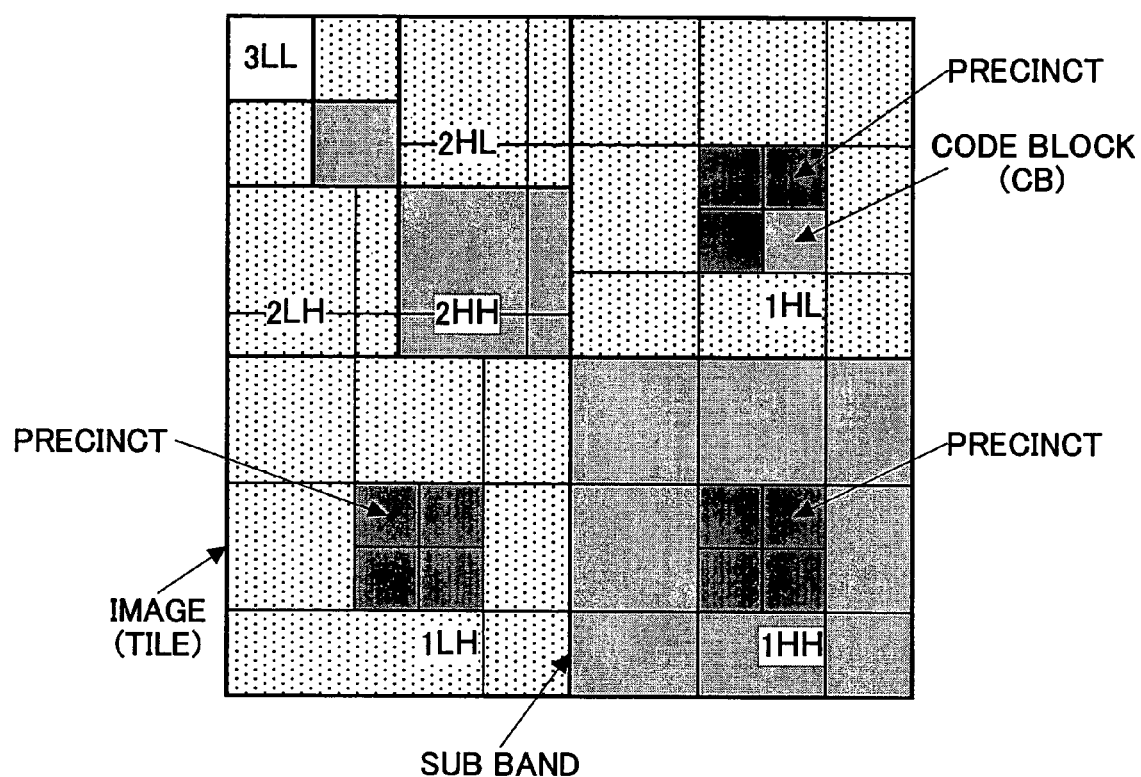
FIG. 27 is a schematic diagram showing the relationship between the tile, sub band, precinct, and code block.

FIG. 27 shows schematically the relationship between the tile, precinct and code block for the case the decomposition number is three.

It should be noted that precinct means a rectangular division of a sub band and roughly indicates the location in the image. The size of the precinct can be specified by a user and may be set equal to the size of the sub band. The precincts of the three sub bands, HL, LH and HH, are treated as a group.

Further, it should be noted that a packet is formed by gathering a part of the codes of all the code blocks included in the precinct (such as the codes of three bit planes starting from the uppermost bit down to the third bit). A packet free form a code is also allowed.

Heretofore, it was explained that each sub band coefficient is encoded in each bit plane unit in each code block. In JPEG 2000, the bit plane is actually classified into three sub bit planes, and the encoding is conducted for each of the sub bit planes.

Thus, the minimum unit of the code discarding process is the sub bit plane. On the other hand, in the case it is desired to simplify the code discarding process, it is also possible to conduct the code discarding process in each bit plane by using the bit plane as the minimum unit of code discarding process. Thus, in the description hereinafter, explanation will be made for the case of discarding the codes while using the bit plane as the minimum unit of code discarding process.

FIG. 1 is a flowchart for illustrating an embodiment of the image processing method according to one embodiment of the present invention.

The image compression process of the present embodiment uses a JPEG 2000 algorithm as the image encoding algorithm, and thus, the image compression process includes, as represented in FIG. 1, a step 100 for performing color transformation of the images, a step 102 for applying a two-dimensional wavelet transformation to each tile image of each component, a step 104 for quantizing the wavelet coefficients in each of the sub bands, a step 106 of bit plane encoding each sub band coefficient to the code block (encoding unit) after quantization, a step 108 for the code discarding and packet generation, and a step 110 for forming encoded data of a predetermined format by using the packet.

Here, the color transformation step 100 is conducted according to the needs as mentioned before. Further, the division of the image into tiles conducted before or after the color transformation step 100 is omitted in FIG. 1. It should be noted that the primary feature of the image compression process of the present invention is the code discarding processing in the step 108, wherein this code discarding step will be explained later in detail.

FIG. 1 also shows an explanation of the embodiment of image compression apparatus of the present invention. Thus, the image compression apparatus of the present embodiment includes the processing unit corresponding to each of the steps shown in FIG. 1, wherein it should be noted that there is provided the unit for conducting the step 108 for discarding the codes.

It should be noted in one embodiment that the unit corresponding to the processing step of FIG. 1 is materialized by a computer program. Thus, the program code, the processor-readable medium on which the program code is recorded, such as various recording (storage) media including magnetic disks, optical disks, magneto-optical disks, semiconductor memory elements, and also a computer especially configured by the computer-readable program code, are also included in the scope of the invention.

Figure 2:
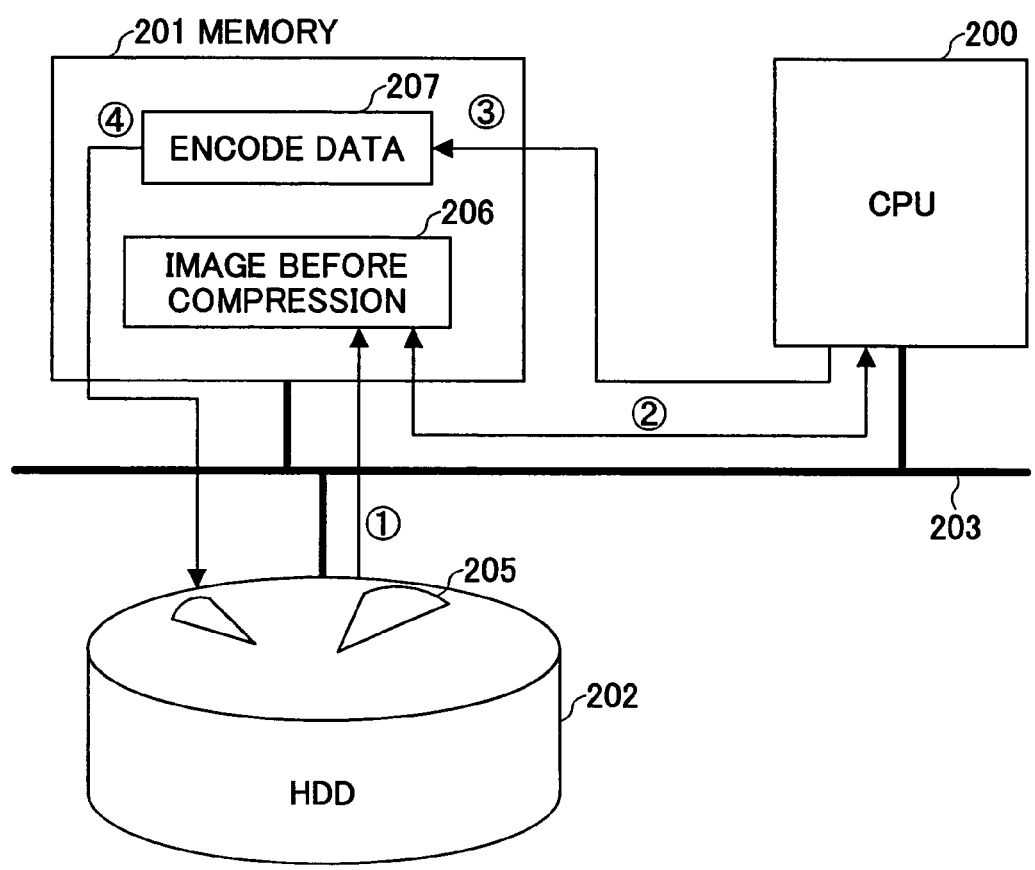
FIG. 2 is a schematic block diagram of the system to which the program of one embodiment of the present invention is implemented.

FIG. 2 is a schematic block diagram for illustrating the mode of one embodiment of the present invention that uses a computer.

Referring to FIG. 2, the image compression apparatus includes a CPU 200, a memory 201 used by the CPU 200 as a work memory area, a hard disk drive 202 used for storing data or program, and a system bus 203. Thus, the program for realizing the processing step or image compression processing is loaded to the memory 201 from the hard disk apparatus 202, and the CPU 200 carries out the processing.

The following summarizes the compression processing.

① The image data 205 to be processed and stored in the hard disk device 202 is read to the region 206 of the memory 201 in response to a command from the CPU 200.

② The CPU 200 reads the image data from the memory and applies the compression processing shown in FIG. 1.

③ The CPU200 writes the encoded data obtained as a result of the processing into a different region 207 of the memory 201.

Further, by a command from the CPU 200, this encoding data is stored in the hard disk device 202.

Figure 3:
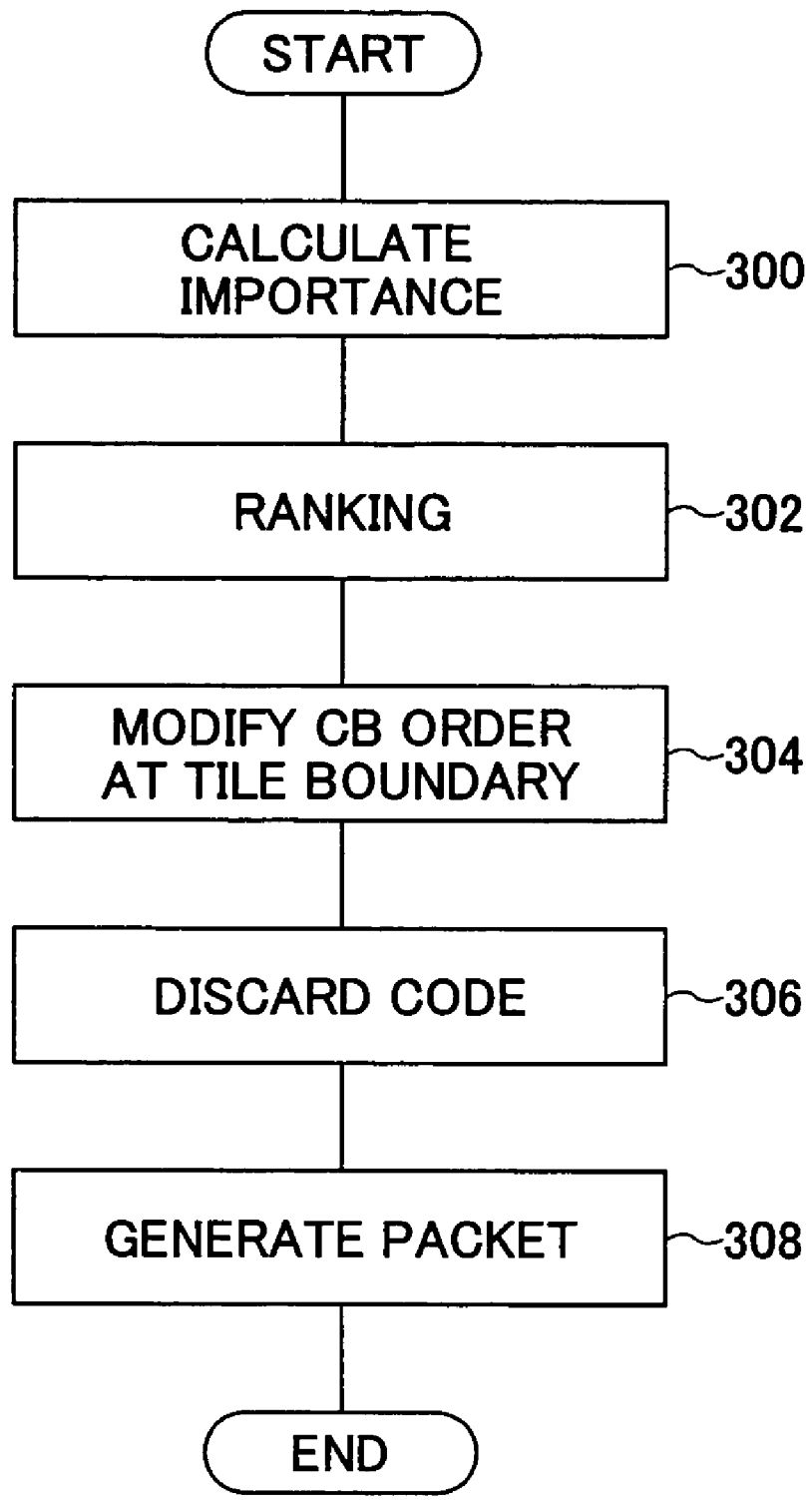
FIG. 3 is a flowchart for illustrating an example of the processing of code discarding/packet generation in FIG. 1.

FIG. 3 is a flowchart illustrating an example of the processing of the step 108 or the construction corresponding to the foregoing processing. Another example of processing or construction corresponding thereto will be described later with reference to FIG. 4.

In the step 300 of FIG. 3, the importance of the codes of each bit plane is calculated for each code block according to the equation below.

$$\text{importance}=(\text{increment of quantization error caused by discarding of codes})\times\sqrt{Gs}/(\text{code amount}) \quad (7)$$

For the "code amount" of Equation (7), the code amount obtained and saved at the time of the bit plane encoding (step 106) is used.

With regard to the "increment of quantization error caused by discarding of the codes," this can be obtained by various methods, wherein D. S. Taubman and M. W. Marcellin, op cit. provides a mathematically rigorous process. In the present specification, the increment of quantization error caused by the discarding of the code will be obtained for the code of the nth bit plane as measured from the lowermost bit according to the relationship $$(\text{increment of quantization error caused by the discarding of the code})=(2^{\wedge}(n-1)-2^{\wedge}(n-2))\times(\text{number of the coefficients in the code block}) \quad (8)$$

It should be noted that $\sqrt{Gs}$ of Equation (7) is a square root of the sub band gain Gs of the sub band in which the code block is included and a predetermined value predetermined for each sub band is used. The wavelet coefficients decoded from the codes are converted to the pixel values after conducting the reverse quantization and reverse wavelet transformation, wherein the quantization error caused by discarding the codes is reflected to the pixel values with a factor different from each other according to the sub bands. The square of this factor is called sub band gain. Thus, the quantization error $\Delta e$ of the wavelet coefficient is multiplied with the square root of the sub band gain as a result of the reverse wavelet transformation and takes the value of $\sqrt{Gs}\cdot\Delta e$.

While detailed explanation is omitted, it should be noted that the square root of the sub band gains of the sub bands LL, HL, LH and HH of the decomposition levels 1 and 2 takes a value as represented in FIG. 16 in the case the wavelet transform called 5×3 noted before is used. In the case of compressing a monochromatic image without color transformation, the values of FIG. 16 are used actually for the term $\sqrt{Gs}$ of Equation (7).

On the other hand, in the case of compressing the image of RGB data after color transformation to the YCbCr color system by the RCT transformation of Equation (2) and restoring the RGB data at the time of decompression by conducting the reverse RCT transformation of Equation (2), it is necessary to use the sub band gain such that the sub band gain takes into consideration the gain of the reverse RCT transformation.

While detailed explanation is not provided, the square root of the gain of the reverse RCT transformation takes the values represented in Table 17. Thus, in the case of compressing an RGB color image formed of each of the R, G and B color components after conversion to the Y, Cr and Cb components by the RCT transformation, the calculation of the importance of the codes for each of the Y, Cr and Cb components is conducted by using a value in which the value shown in FIG. 16 (square root gain of the reverse wavelet transformation) is multiplied with the value shown in FIG. 17 for the term $\sqrt{GG}$ of Equation (7) as represented in FIGS. 18, 19 and 20.

Next, in the step 302, each bit plane code in each code block is provided with a ranking or an order of code discarding process for the entire sub bands according to the order of importance obtained in the previous step, starting from the code of smallest importance, wherein this ranking process is conducted for each of the tiles consecutively or simultaneously for the entire tiles and hence the entire image. This ranking may be conducted by sorting of the codes according to the importance or may be conducted by the procedure that uses the Lagrange's method of undetermined multipliers, as described in D. S. Taubman and M. W. Marcellin, op. cit. In the case of the color images, similar ranking of the codes is achieved simultaneously for the entire color component codes.

Conventionally, discarding the code is conducted in the order of the provided rank, starting from the least significant bit plane, until a desired compression ratio (code amount) is reached.

In such a code discarding procedure, there is a possibility that a significant difference appears in the ranking provided to the codes between the code blocks adjacent to each other across the tile boundary, irrespective of whether the ranking is conducted consecutively for each tile or simultaneously to the entire tiles, and as a result, there arises a possibility of occurrence of large difference in the code discarding amount of the code blocks, in other words, a large difference in the number of the bit planes in which the codes are discarded, between the code blocks adjacent to each other across the tile boundary. In such a case, there appears a large difference in the quantization error between the code blocks adjacent to each other across the tile boundary, and this has become the cause of the tile boundary distortion.

The present invention suppresses the tile boundary distortion caused by such a mechanism by changing the code discard amount for the code blocks adjacent to each other across a tile boundary in the step 304 preceding the code discarding step such that the code discarding amount becomes equal or generally equal between the code blocks that are adjacent to each other across the tile boundary.

For example, consider the case in which one of the code blocks adjacent to each other has the ranking indicating that the codes of ten bit planes are to be discarded while the other code block has the ranking that the codes of only six bit planes are to be discarded. In such a case, the present invention modifies the ranking of the former code block such that there are seven bit planes that are to be discarded in place of the ten bit planes.

After such a correction of ranking or order, the step 306 is conducted in which the codes are discarded according to the modified order, starting from the lowermost bit plane, until the desired code discard amount is reached.

Further, in the step 308, the remaining codes are gathered together to form a packet.

Thus, according to the image compression method of the present embodiment, the step 108 for discarding the codes includes the steps 300 and 302 for providing the ranking of code discarding according to the importance of the codes and also the step 304 for modifying the given rank or order for making generally even the code discarding amount between the code blocks adjacent to each other across a tile boundary.

In other words, according to the image compression apparatus of the present embodiment, the unit for discarding codes corresponding to the step 108 includes a unit corresponding to the steps 300 and 302 for providing the order of code discarding according to the importance of the code and further the unit corresponding to the step 304 for modifying the provided order in order to make generally even the code discard amount between the code blocks that are adjacent to each other across the tile boundary.

Figure 5:
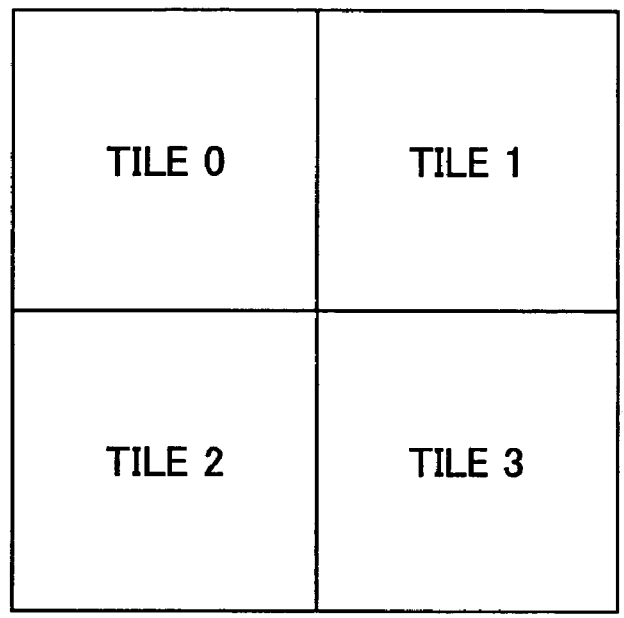
FIG. 5 is a diagram showing an example of division of an image into tiles.

With regard to the relationship between the code blocks adjacent to each other across a tile boundary, an example shown in FIG. 5 is considered in which an image is divided into four tiles 0-3.

Figure 6:
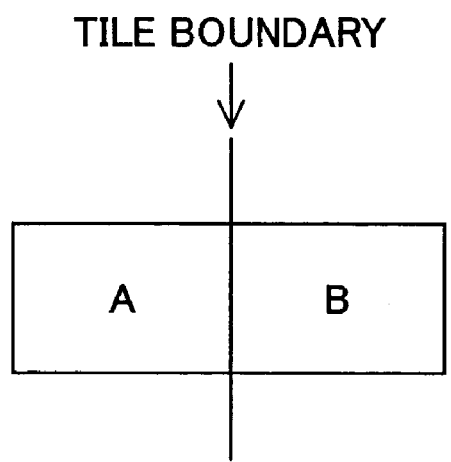
FIG. 6 is a diagram showing code blocks in a mutually adjacent relationship across a vertical tile boundary.
Figure 7:
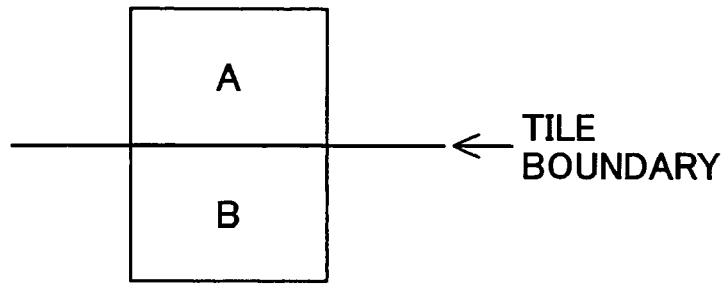
FIG. 7 is a diagram showing code blocks in a mutually adjacent relationship across a horizontal tile boundary.
Figure 8:
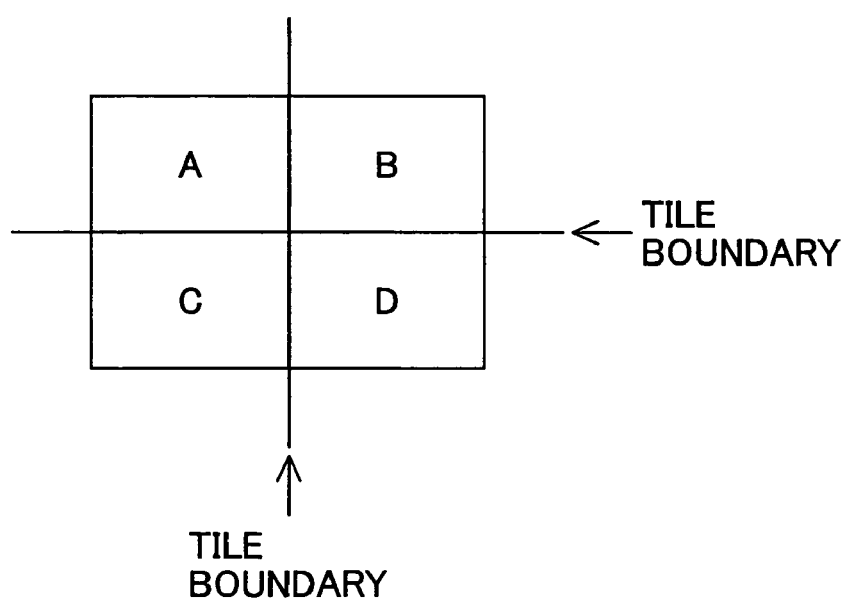
FIG. 8 is a diagram showing code blocks in a mutually adjacent relationship across four tile boundaries.

In such a case, there can exist a situation shown in FIG. 6 in which two code blocks A and B are adjacent to each other laterally across a vertical tile boundary, a situation shown in FIG. 7 in which two code blocks A and B are adjacent to each other vertically across a horizontal tile boundary, and a situation shown in FIG. 8 in which four code blocks A, B, C and D are adjacent to each other across a tile boundary. Here, it should be noted that the mutually adjacent relationship under consideration is the relationship existing between the code blocks of the sub bands of the same decomposition level. In the case of the color images, the mutually adjacent relationship between the code blocks is considered for each of the color components.

For the code blocks that are adjacent to each other across a tile boundary, there exist a code block set called "type 1" including the coefficients that are literally adjacent to each other across the tile boundary in the state the wavelet coefficients are interleaved, in other words the corresponding picture elements are actually adjacent to each other across the tile boundary, and also a code block set called "type 2" in which the code blocks of the same sub band are adjacent to each other across the tile boundary. It should be noted that the present invention encompasses any of the modes in which the code blocks of the type 1 are chosen, the code blocks of the type 2 are chosen or the code blocks of both of the types 1 and 2 are chosen, for the code block set adjacent to each other across the tile boundary.

Hereinafter, the code block set of the types 1 and 2 will be explained in more detail with reference to FIGS. 9 through 15.

Figure 9:
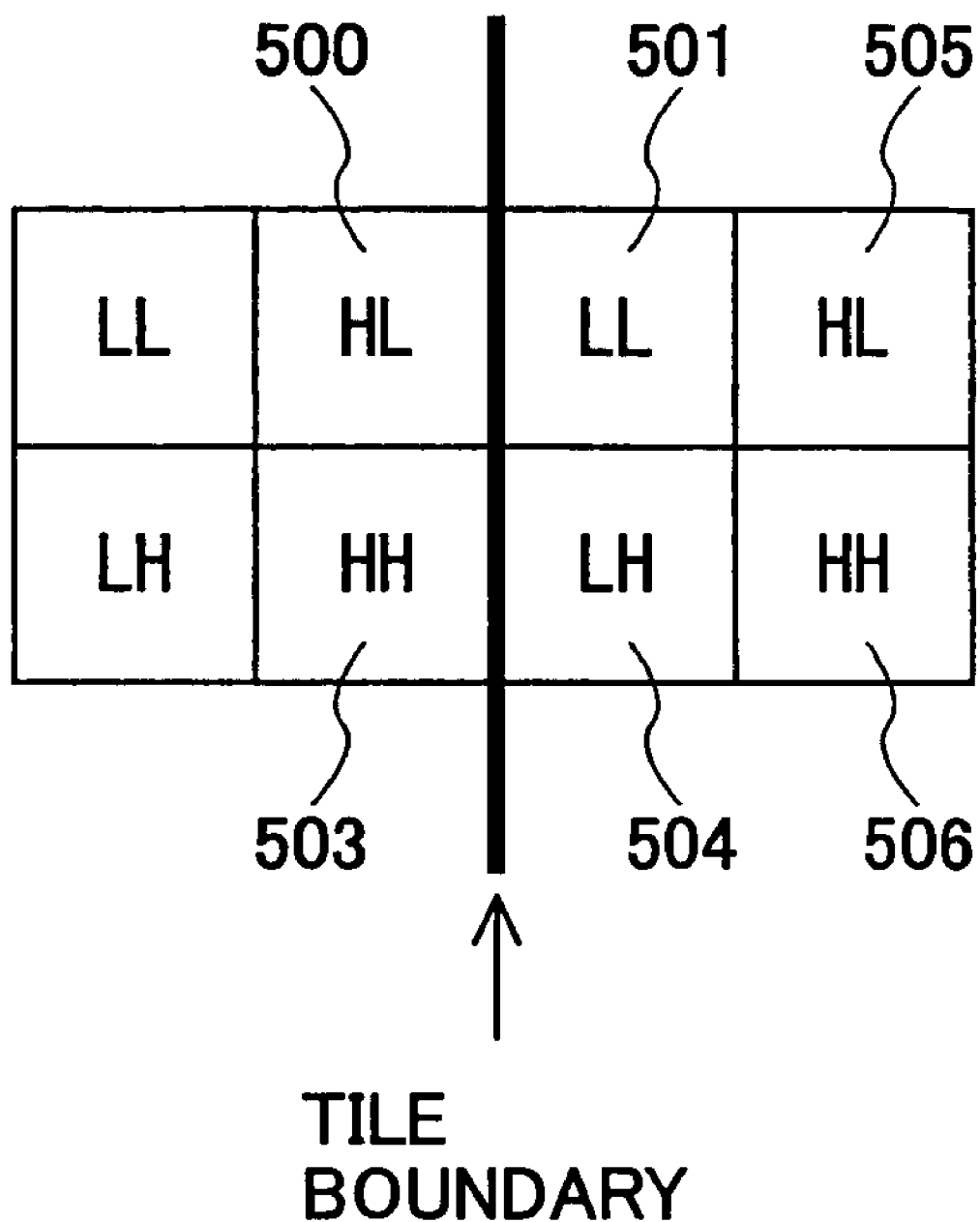
FIG. 9 is a diagram showing an interleaved arrangement of coefficients across a vertical tile boundary.

As will be understood easily from FIG. 23, there appears a coefficient array shown in FIG. 9 at the vertical tile boundary in the interleaved state of the coefficient. Thus, in the case of choosing the type 1 set, the code block set having the code block of the HL sub band and including therein the coefficients 500 and the code block of the LL sub band including therein the coefficient 501, and also the code block set having the code block of the HH sub band including therein the coefficients 503 and the code block of the LH sub band including therein the coefficients 504, are chosen as the code block set that are adjacent to each other.

In the case of the type 2 set, there is a general tendency that the quantization error associated with discarding of code becomes larger in the HL coefficients and the HH coefficients as compared with the LL coefficients or the LH coefficients. Thus, it is reasonable to provide emphasis on the code blocks of the HL sub band and HH sub band when considering the mutually adjacent relationship between the code blocks.

Thus, in the case of adopting the type 2 set, the code block set of the code block of the HL sub band including the coefficients 500 and the code block of the HL sub band including the coefficients 505, and also the code block set of the code block of the HH sub band including the coefficients 503 and the code block of the HH sub band including the coefficients 506 are chosen as the code block set of the code blocks that are adjacent to each other. Thus, in this case, the cod blocks adjacent to each other across the tile boundary are the code blocks of the same sub band.

Figure 10:
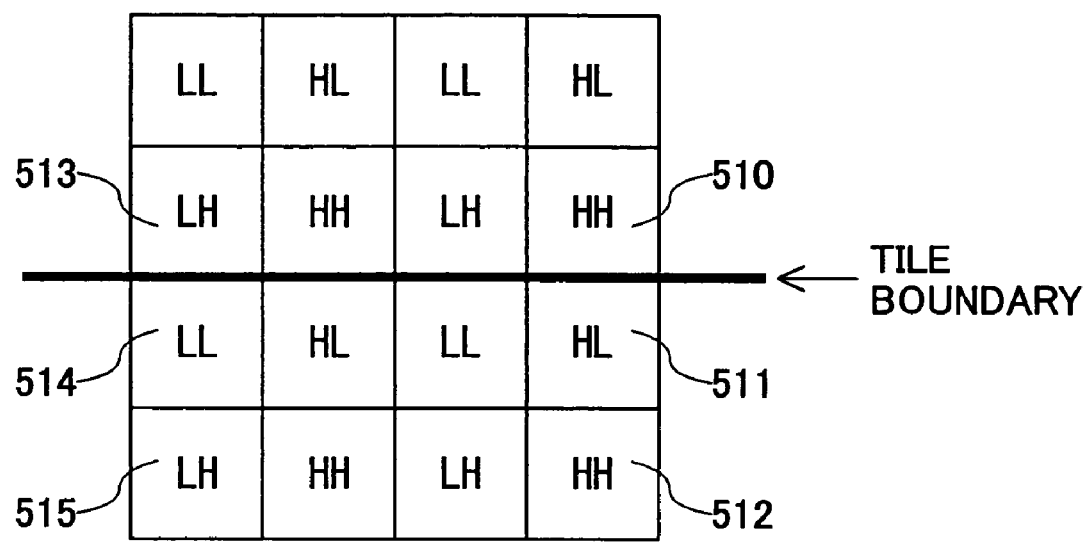
FIG. 10 is a diagram showing an interleaved arrangement of coefficients across a horizontal tile boundary.

Similarly, in the state in which the coefficients are interleaved, there appears the coefficient array shown in FIG. 10 at the tile boundary extending in the horizontal direction.

Thus, when the type 1 set is used, the code block set having the code block of the HH sub band including the coefficients 510 and the code block of the HL sub band including the coefficients 511, and the code block set having the code block of the LH sub band including the coefficients 513 and the code block of the LL sub band including the coefficients 514, are chosen as the code block set in which the code blocks are adjacent to each other. When the type 2 set is used, the code block set having the code block of the HH sub band including the coefficients 510 and the code block of the HH sub band including the coefficients 512, and the code block set having the code block of the LH sub band including the coefficients 513 and the code block of the LH sub band including the coefficients 515, are chosen as the code block set in which the code blocks are adjacent to each other. In this case, it should be noted that the code block set in which the code blocks adjacent to each other across the tile boundary form the same sub band.

Figure 11:
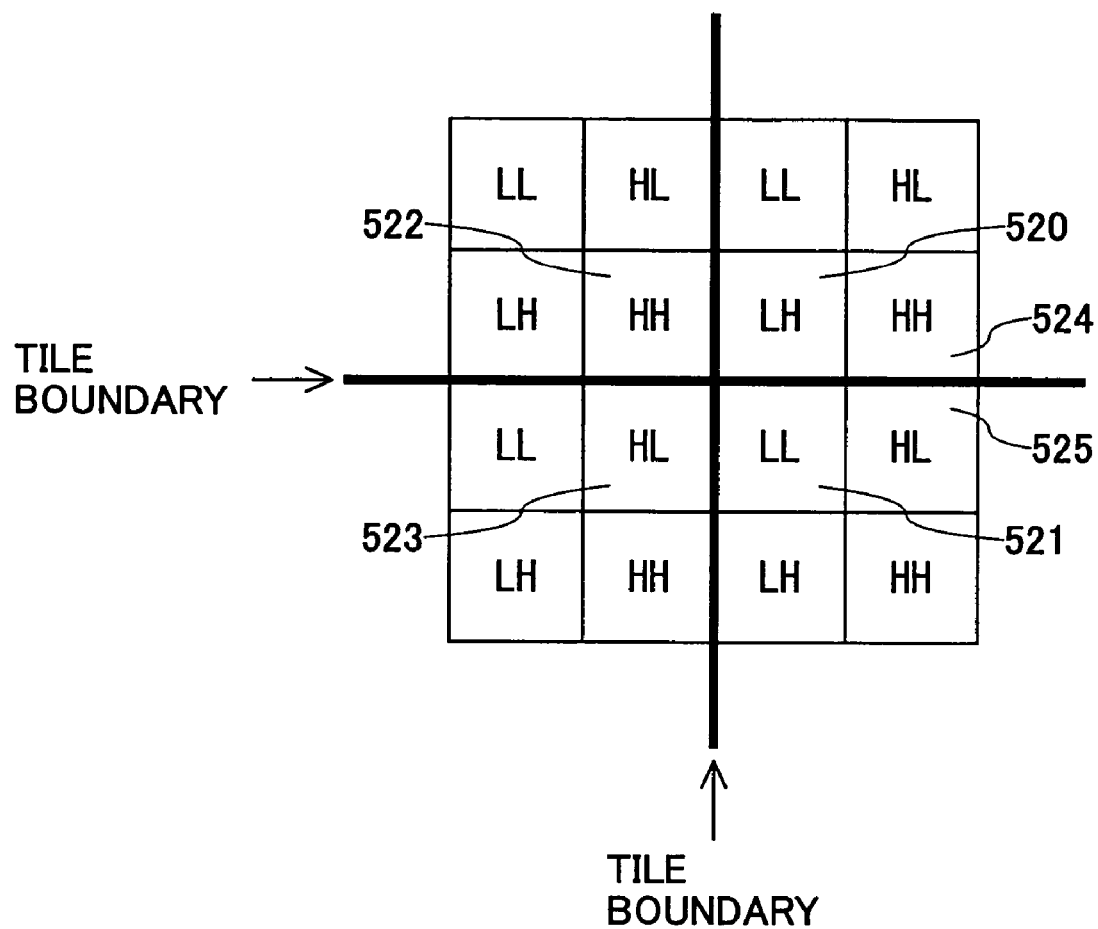
FIG. 11 is a diagram showing an interleaved arrangement of coefficients across four tile boundaries.
Figure 12:
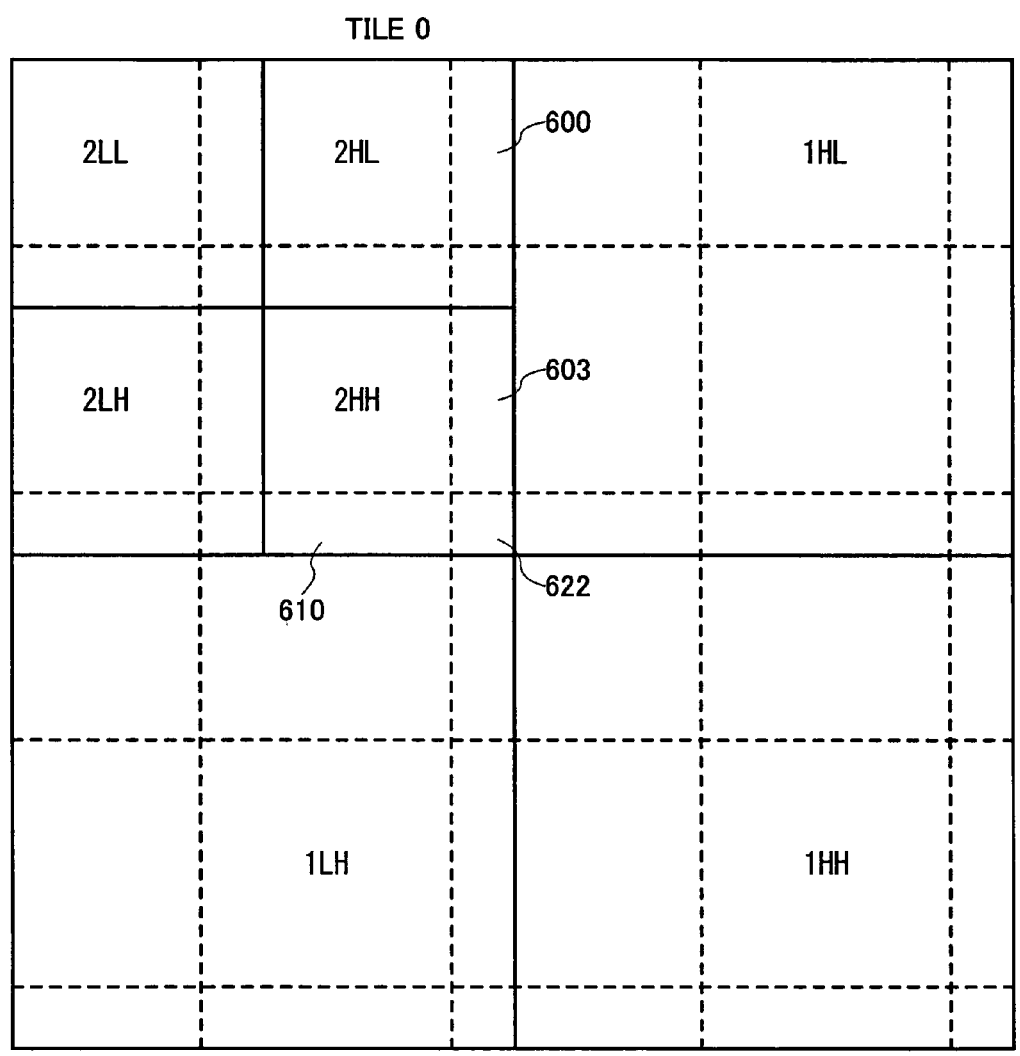
FIG. 12 is a diagram showing an example of code block division in tile 0.

Similarly, in the interleaved state of the coefficients, there appears a coefficient array as indicated in FIG. 11 at the boundary of the four tiles. Thus, in the case the type 1 set is used, the code block set of four code blocks respectively including the coefficients 520, 521, 522 and 523, is chosen as the code block set of the code blocks that are adjacent to each other. When the type 2 set is used, the code block set of four code blocks respectively including the coefficients 522, 523, 524 and 525, are chosen for the code block set of the code blocks that are adjacent to each other.

FIGS. 12-15 show the sub bands corresponding to the tiles 0-3 of FIG. 5.

Referring to the drawings, the wavelet transform is conducted down to the decomposition level 2, and as a result, each sub band is divided into code blocks for encoding as represented in the drawing by broken lines. Here, it should be noted that the precinct size is set identical to the sub band size.

Below, the mutually adjacent relationship of the code blocks at the decomposition level 2 will be explained with reference to these drawings.

Figure 13:
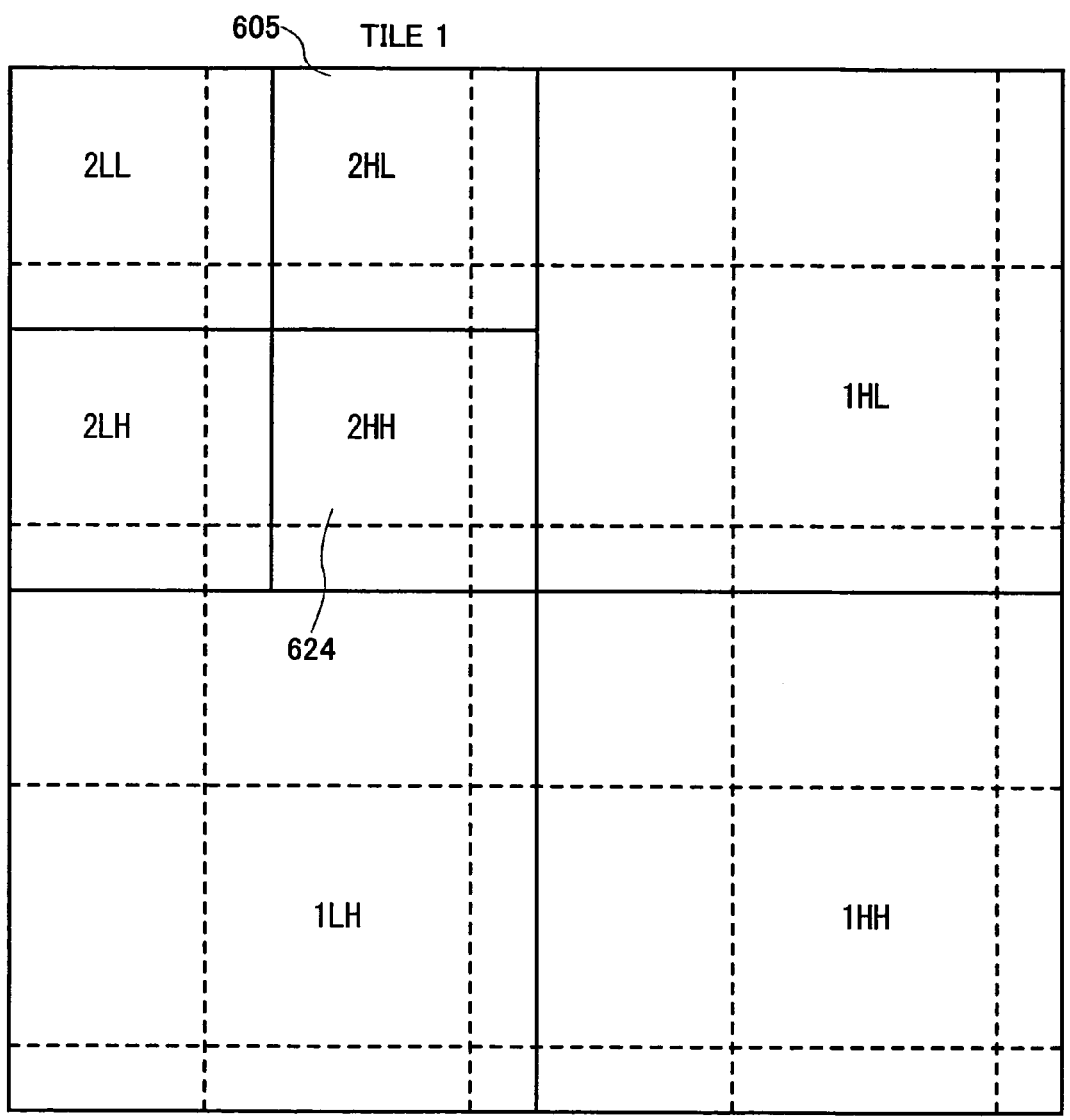
FIG. 13 is a diagram showing an example of the code block division in tile 1.

In the case the coefficients 500 are included in the code block 600 of the tile 0 (see FIG. 12), the coefficients 505 are included in the code block 605 of the tile 1 (see FIG. 13). Further, the coefficients 503 are included in the code block 603 (see FIG. 12) and the coefficients 506 are included in the code block 605 of the tile 1 (FIG. 13). Thus, the set of the code blocks 600 and 605 and the set of the code blocks 603 and 600 are chosen as the code block set in which the code blocks are in mutually adjacent relationship across a vertical tile boundary (type 2).

Figure 14:
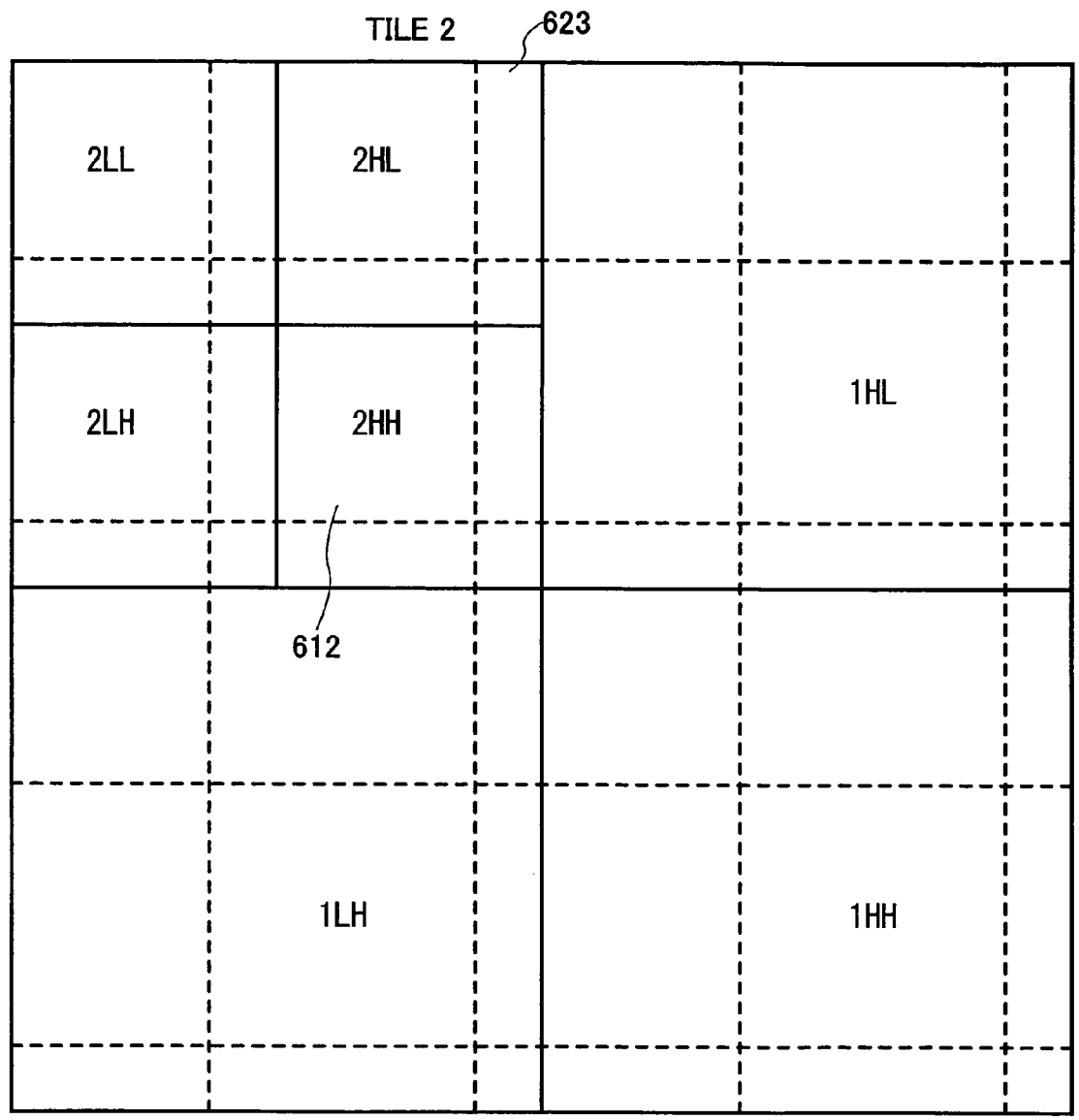
FIG. 14 is a diagram showing an example of the code block division in tile 2.

In the case the coefficients 510 of FIG. 10 are included in the code block 610 of the tile 0 (FIG. 12), the coefficients 512 are included in the code block 612 of the tile 2 (FIG. 14). Thus, the set of the code blocks 610 and 612 is chosen as the code block set in which the code blocks are adjacent to each other across a horizontal tile boundary (type 2).

Figure 15:
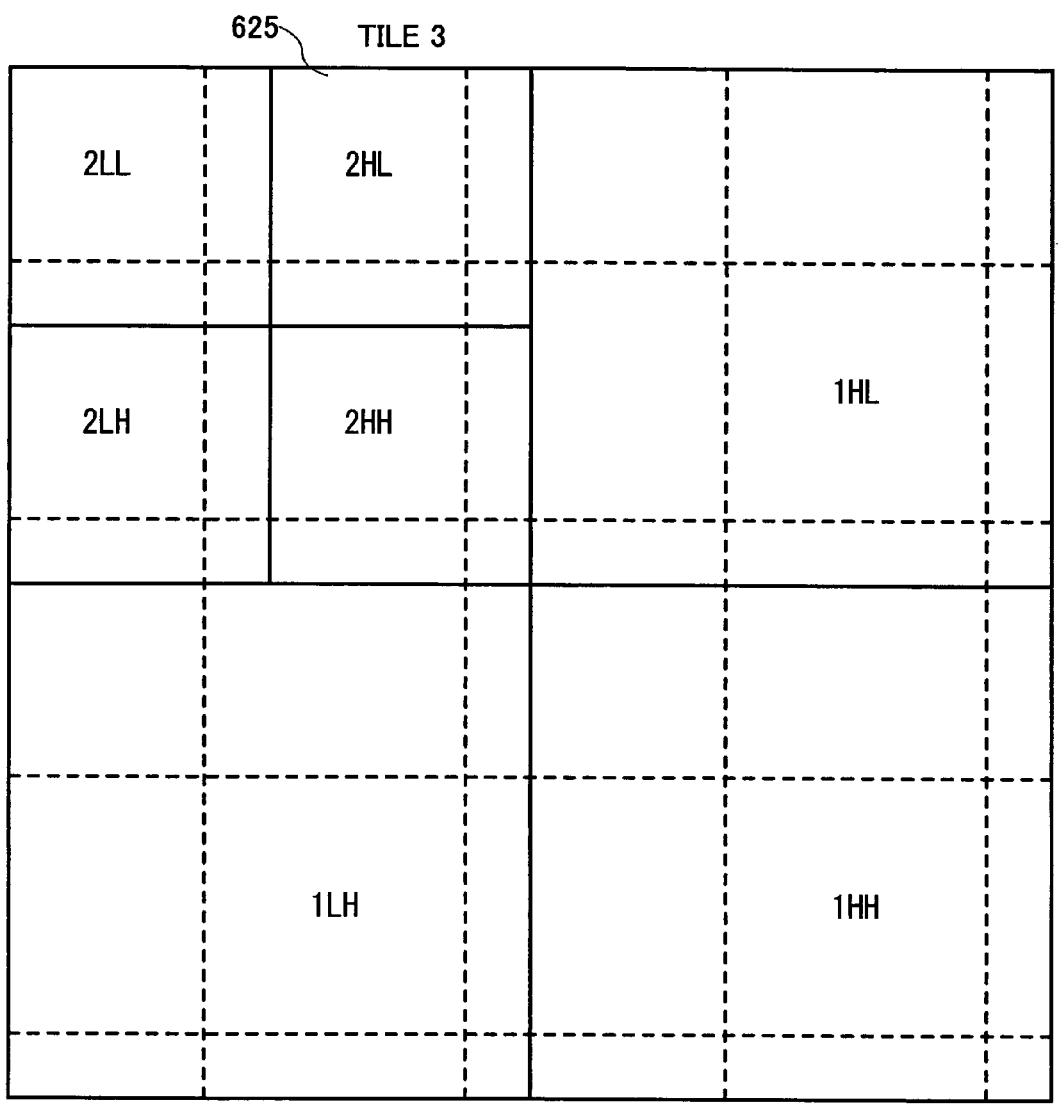
FIG. 15 is a diagram showing an example of code block division in tile 3

Further, the coefficients 522 of FIG. 11 are included in the code block 622 of the tile 0 (FIG. 12), the coefficients 524 are included in the code block 624 of the tile 1 (FIG. 13), the coefficients 523 are included in the code block 623 of the tile 2 (FIG. 14), and the coefficients 525 are included in the code block 625 of the tile 3 (FIG. 15). Thus, the set of the code blocks 622, 623, 624 and 625 is chosen as the code block set in which the code blocks are adjacent to each other (type 2).

In average, there is a tendency, in view of the fact that the code discarding processing is conducted starting from the sub band of low decomposition level, that the difference of code discarding amount between the adjacent code blocks across a tile boundary appears particularly conspicuous for the codes of low decomposition level.

Thus, in the present embodiment, the modification of the order of code discarding processing in the step 304 for making generally even the code discarding amount may be conducted only for those codes of the sub bands having a decomposition level lower than a predetermined level (such as the decomposition level 1) while maintaining sufficient effect for suppressing the tile boundary distortion. With such a procedure, the amount of processing can be reduced also. Thus, it should be noted that the present invention also includes such a mode of implementation.

Next, another example of the processing of the step 108 of FIG. 1 or another example of the construction of the corresponding processing to this step will be explained with reference to the flowchart of FIG. 4.

Figure 4:
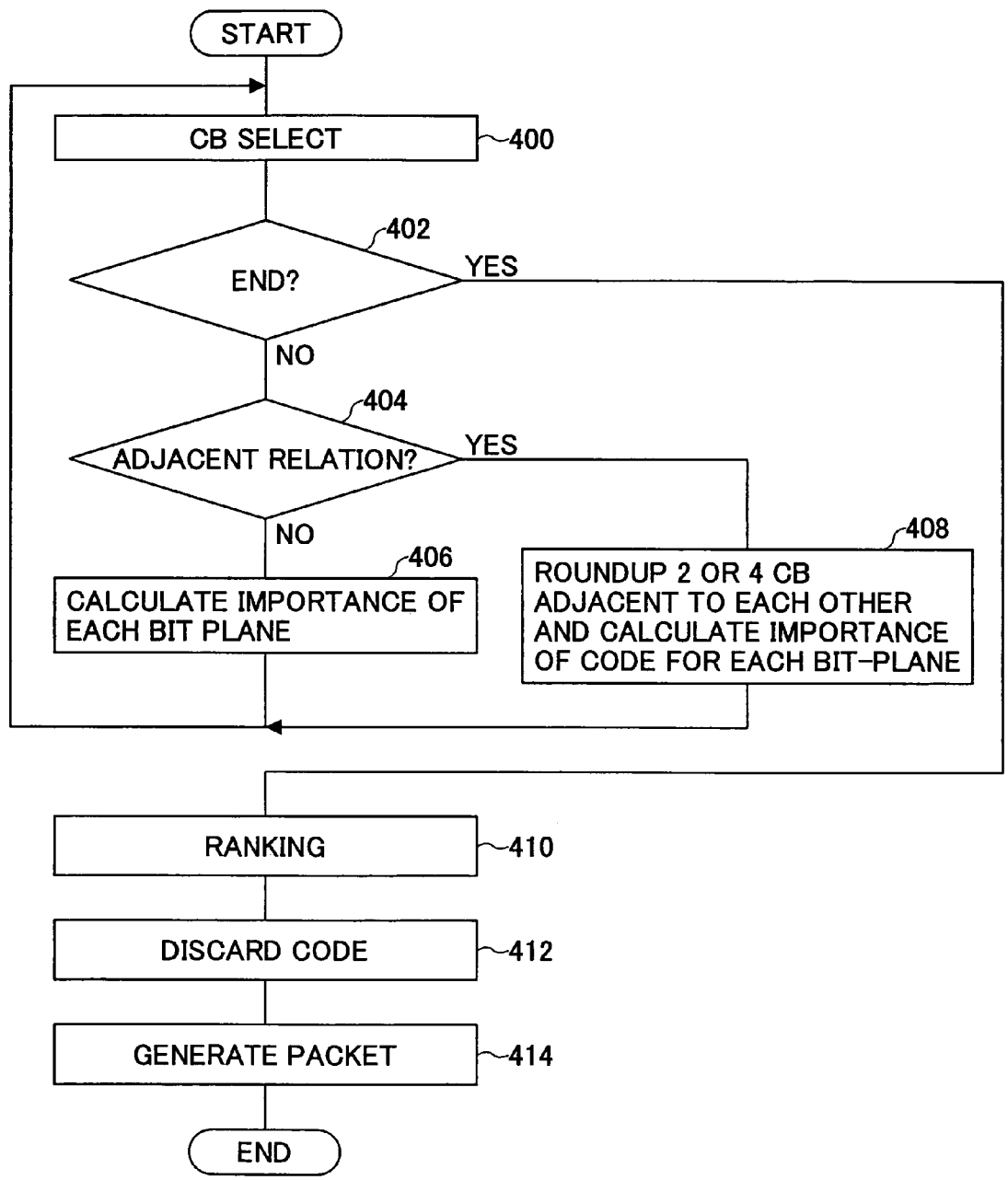
FIG. 4 is a flowchart illustrating another example of the processing of code discarding/packet generation in FIG. 1.

Referring to FIG. 4, a code block is selected in the step 400 and examination is made in the step 404 whether the pertinent code block is in a mutually adjacent relationship with another code block across a tile boundary. Explanation has been made already with regard to this mutually adjacent relationship.

In the case there exists no other code blocks in the mutually adjacent relationship, the step 406 is conducted in which the importance of the code is calculated for each bit plane of the pertinent code block. This process of obtaining the importance is explained already with reference to the step 300 of FIG. 3. After this calculation, the process returns to the step 400 for selection of the next code block.

In the case there exists another code block in mutually adjacent relationship with the selected code block across a tile boundary (Yes in step 404), the step 408 is conducted in which the two or four code blocks in the mutually adjacent relationship are gathered together so that they are treated as a single code block. Further, calculation is made about the importance of the code for each bit plane. This procedure of calculating the importance is conducted similarly to the step 406 except that the sum of the code amount of each bit plane of the two or four code blocks is used for the denominator of Equation (7) and a cum of the values (product of the increment of the quantization error and the square root of the sub band gain) obtained for each bit plane of the two or four code blocks is used for the numerator of Equation (7). Thereafter, the process returns to the step 400 for selection of the next code block.

When the calculation of importance of the code is completed for all of the code blocks (Yes in step 402), the step 410 is conducted in which the rank or order of discarding is provided to the code of each bit plane in each of the code blocks, starting from the code having the least significant importance.

Further, in the step 412, the codes are discarded starting from the lower most bit plane according to the rank or order of discarding, until a desired code amount is reached. Finally, in the step 414, the remaining codes not discarded are gathered to form a packet.

In the step 408, it should be noted that those codes of the code blocks that are in mutually adjacent relationship across a tile boundary and belonging to the same bit plane are regarded as having the same importance, and thus, these code blocks are provided with the same rank. Thus, the code discarding amount becomes more or less even between these code blocks. With this, the quantization error associated with the code discarding processing becomes also even more or less, and the tile boundary distortion is suppressed.

Thus, in one embodiment of the image compression method of the present embodiment explained herein, the step 108 for discarding the codes includes, in addition to the step 406 for calculating the importance of the codes for each bit plane in the code blocks not in mutually adjacent relationship across a tile boundary, but also the step 408 for calculating the importance of the code for each bit plane with regard to the set of the code blocks that are in the mutually adjacent relationship in order to make even the code discarding amount more or less, by treating these two or four code blocks as a single code block. Further, there is provided a step 410 that provides the order of code discarding for the codes of the code blocks not in the mutually adjacent relationship with each other according to the importance calculated by the step 406 and the order of code discarding for the codes of the code blocks that are in the mutually adjacent relationship with each other according to the importance calculated in the step 408. In other words, the image compression apparatus of this mode of invention includes the unit for discarding the code corresponding to the step 108, the unit for calculating the importance corresponding to the step 406 and also the unit for calculating the importance corresponding to the step 408 and further the units corresponding to the step 410.

As explained with reference to the step 304 of FIG. 3, there is a tendency that an observable difference appears in the code discarding amount between the code blocks that are adjacent to each other across a tile boundary, particularly in the decomposition level is low. Thus, it is possible to apply the process of the step 408 only to the code blocks of the sub band having a decomposition level lower than a predetermined level, such as the decomposition level 1 in the cease the number of the decomposition is 2. The present invention includes also such a mode.

Further, the present invention is by no means limited to the embodiments described heretofore, but various variations and modifications may be made without departing from the scope of the invention.

What is claimed is:

1. An image compressing apparatus dividing an image into plural tiles, decomposing each of the tiles into plural sub band by frequency conversion, and bit plane encoding each of the sub bands for each encoding unit, the image compressing apparatus comprising:
   a code discarding unit to selectively discard a code obtained by the bit plane encoding for each encoding unit,
   the code discarding unit including a discard amount setting unit to make generally even the amount of code discarding in those encoding units that are in mutually adjacent relationship across a tile boundary.

2. The image compressing apparatus as claimed in claim 1, wherein the discard amount setting unit makes generally even the code discarding amount between the encoding units that are adjacent to each other across a tile boundary and forming the same sub band.

3. The image compressing apparatus as claimed in claim 1, wherein the discard amount setting unit makes generally even the code discarding amount between the encoding units that are adjacent to each other across a tile boundary and forming a sub band lower than a predetermined decomposition level.

4. The image compressing apparatus as claimed in claim 1, wherein the code discarding unit includes a ranking unit, the ranking unit to provide a rank indicative of an order of discarding to a code in each bit plane in each of the encoding units according to an importance of the code,
   the discard amount setting unit modifying the rank provided by the ranking unit.

5. The image compressing apparatus as claimed in claim 1, wherein the discard amount setting unit treats a set of encoding units that are in mutually adjacent relationship across the tile boundary as a single encoding unit and calculates importance of code for each of bit planes for the single encoding unit,
   the code discarding unit comprising: an importance calculation unit to calculate importance of the code of the bit plane for each of the single encoding unit; and a ranking unit to provide a rank indicative of order of discarding the code to each code in each bit plane for each of the single encoding units that are adjacent to each other across the tile boundary, according to the importance calculated by the code discarding unit, the ranking unit providing a rank indicative of an order of discarding a code to each code in each bit plane for encoding units that are not in a mutually adjacent relationship across a tile boundary, according to an importance calculated by the importance calculation unit.

6. The image compressing apparatus as claimed in claim 1, wherein the image compressing apparatus uses an algorithm based on JPEG 2000, and wherein a code block is used for the encoding unit.

7. The image compressing apparatus as claimed in claim 6, wherein the encoding unit forms an HL sub band and an HH sub band.

8. An image compressing method for compressing an image by an algorithm, the algorithm dividing an image into plural tiles, dividing each of the tiles into plural sub bands by frequency conversion, and bit-plane encoding each of the sub bands for each encoding unit, the method comprising:
   a code discarding step for discarding a code obtained by the bit-plane encoding conducted for each encoding unit selectively, including making generally even a code discarding amount in those encoding units that are adjacent to each other across a tile boundary.

9. The method as claimed in claim 8, wherein making generally even the code discarding amount makes generally even the code discarding amount for those encoding units belonging to the same sub band and adjacent to each other across the tile boundary.

10. The method as claimed in claim 8, wherein making generally even the code discarding amount makes generally even the code discarding amount for those encoding units belonging to a sub band of a specific decomposition level or lower and in a mutually adjacent relationship across the tile boundary.

11. The method as claimed in claim 8, wherein the algorithm is an algorithm based on JPEG 2000.

12. A computer-implemented method for compressing an image by an algorithm, the algorithm dividing an image into plural tiles, dividing each of the tiles into plural sub bands by frequency conversion, and bit-plane encoding each of the sub bands for each encoding unit, the method comprising:
   discarding a code obtained by the bit-plane encoding conducted for each encoding unit selectively, including making generally even a code discarding amount in those encoding units that are adjacent to each other across a tile boundary.

13. The computer-implemented method as claimed in claim 12, wherein making generally even the code discarding amount generally even the code discarding amount for those encoding units belonging to the same sub band and adjacent to each other across the tile boundary.

14. The computer-implemented method as claimed in claim 12, wherein making generally even the code discarding amount makes generally even the code discarding amount for those encoding units belonging to a sub band of a specific decomposition level or lower and in a mutually adjacent relationship across the tile boundary.

15. The computer-implemented method as claimed in claim 12, wherein the algorithm is an algorithm based on JPEG 2000.

16. An article of manufacture having one or more computer-readable medium storing computer-executable instructions which, when executed by a computer, cause the computer to compress an image by a method using an algorithm, the algorithm dividing an image into plural tiles, dividing each of the tiles into plural sub bands by frequency conversion, and bit-plane encoding each of the sub bands for each encoding unit, the method comprising:

discarding a code obtained by the bit-plane encoding conducted for each encoding unit selectively, including second program code units for making generally even a code discarding amount in those encoding units that are adjacent to each other across a tile boundary.

17. The article of manufacture as claimed in claim 16, wherein discarding the code makes generally even the code discarding amount for those encoding units belonging to the same sub band and adjacent to each other across the tile boundary.

18. The article of manufacture as claimed in claim 16, wherein discarding the code makes generally even the code discarding amount for those encoding units belonging to a sub band of a specific decomposition level or lower and in a mutually adjacent relationship across the tile boundary.

19. The article of manufacture as claimed in claim 16, wherein the algorithm is an algorithm based on JPEG 2000.

20. A computer specially configured with a computer-readable medium storing a computer program causing the computer to compress an image by an algorithm, the algorithm dividing an image into plural tiles, dividing each of the tiles into plural sub bands by frequency conversion, and bit-plane encoding each of the sub bands for each encoding unit, the computer program comprising:

a first unit for discarding a code obtained by the bit-plane encoding conducted for each encoding unit selectively, the first unit including a second unit for making generally even a code discarding amount in those encoding units that are adjacent to each other across a tile boundary.

21. The computer as claimed in claim 20, wherein the second unit makes generally even the code discarding amount for those encoding units belonging to the same sub band and adjacent to each other across the tile boundary.

22. The computer as claimed in claim 20, wherein the second unit makes generally even the code discarding amount for those encoding units belonging to a sub band of a specific decomposition level or lower and in a mutually adjacent relationship across the tile boundary.

23. The computer as claimed in claim 20, wherein the algorithm is an algorithm based on JPEG 2000.

\* \* \* \* \*